(12) United States Patent
Hikai

(10) Patent No.: US 6,499,261 B2
(45) Date of Patent: Dec. 31, 2002

(54) FASTENING SEALING MEMBER AND SIDING BOARDS ATTACHMENT STRUCTURE

(75) Inventor: Satoshi Hikai, Aichi (JP)

(73) Assignee: Nichiha Co., Ltd., Nagoya (JP)

( * ) Notice: Subject to any disclaimer, the term of this patent is extended or adjusted under 35 U.S.C. 154(b) by 0 days.

(21) Appl. No.: 10/052,257

(22) Filed: Jan. 23, 2002

(65) Prior Publication Data

US 2002/0095889 A1 Jul. 25, 2002

(30) Foreign Application Priority Data

Jan. 24, 2001 (JP) ........................................ 2001-016242

(51) Int. Cl.[7] .............................. E04H 1/00; E04B 2/00; A47F 5/00; A47H 1/10; F16B 45/00
(52) U.S. Cl. ..................... 52/235; 52/506.05; 52/547; 248/300; 248/301; 248/304; 248/220.21; 403/381
(58) Field of Search .............................. 52/235, 506.01, 52/506.05, 506.06, 506.08, 506.09, 512, 109, 547; 403/381; 428/300, 301

(56) References Cited

U.S. PATENT DOCUMENTS

| | | | | |
|---|---|---|---|---|
| 4,262,464 A | * | 4/1981 | Ludowici | |
| 5,881,522 A | * | 3/1999 | Dobija | |
| 6,266,937 B1 | * | 7/2001 | Watanabe | |
| 6,289,644 B1 | * | 9/2001 | Gerhaher | |
| 6,315,489 B1 | * | 11/2001 | Watanabe | |

FOREIGN PATENT DOCUMENTS

| | | | |
|---|---|---|---|
| JP | 406248777 | * | 9/1994 |
| JP | 406322928 | * | 11/1994 |
| JP | 2001-355325 | | 12/2001 |
| JP | 2002-54285 | | 2/2002 |
| JP | 2002-81186 | | 3/2002 |

* cited by examiner

Primary Examiner—Carl D. Friedman
Assistant Examiner—Kevin McDermott
(74) Attorney, Agent, or Firm—Oblon, Spivak, McClelland, Maier & Neustadt, P.C.

(57) ABSTRACT

A fastening sealing member configured to fasten siding boards to a building framework, including a base plate portion having a flat rear surface, spacing portions at left and right ends of the base plate portion, each of which has a front face forward from the base plate portion, a central horizontally rising plate portion projecting forwardly in the horizontal direction from the base plate portion, a central front plate portion in the vertical direction at a front end of the central horizontally rising plate portion, supporting portions projecting forwardly in the horizontal direction from the base plate portion at left and right sides of the central horizontally rising plate portion, an upper-board engagement portion bent upwardly from the supporting portion, a lower-board engagement portion bent downwardly from the supporting portion, and a connecting portion in the vertical direction between the upper-board and lower-board engagement portions.

15 Claims, 25 Drawing Sheets

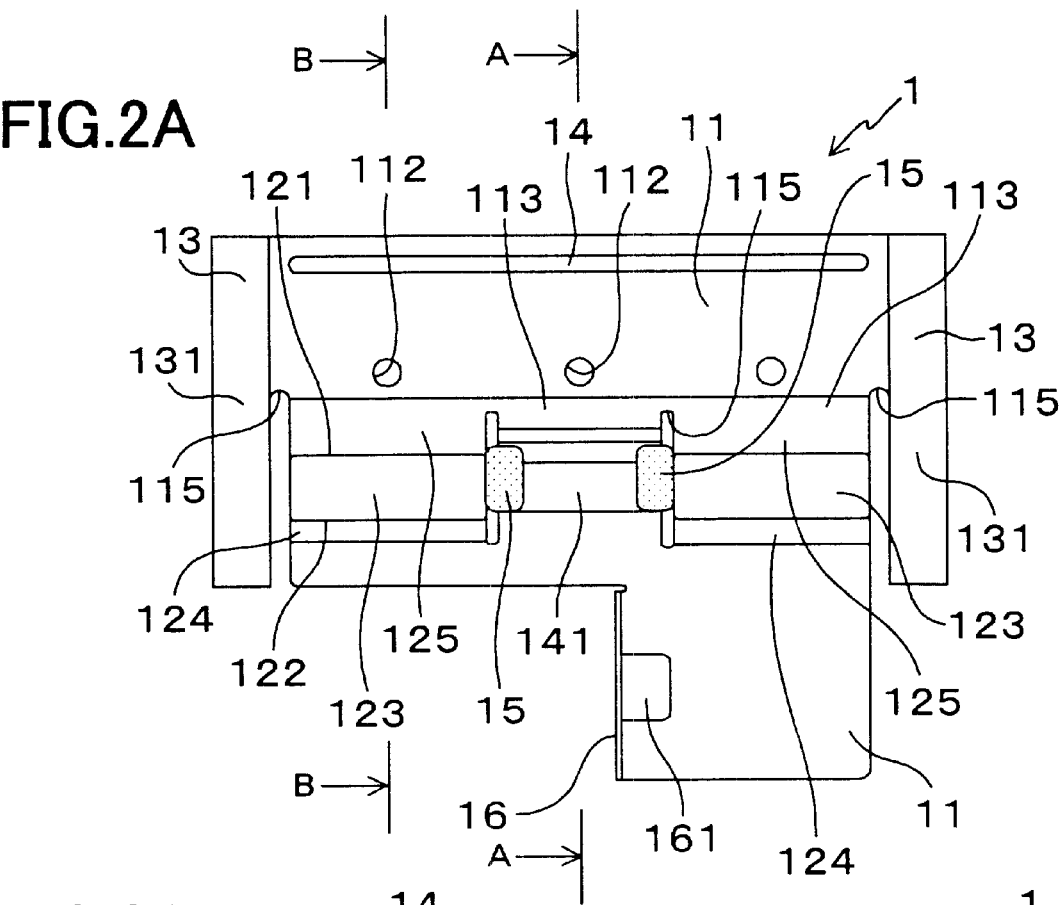
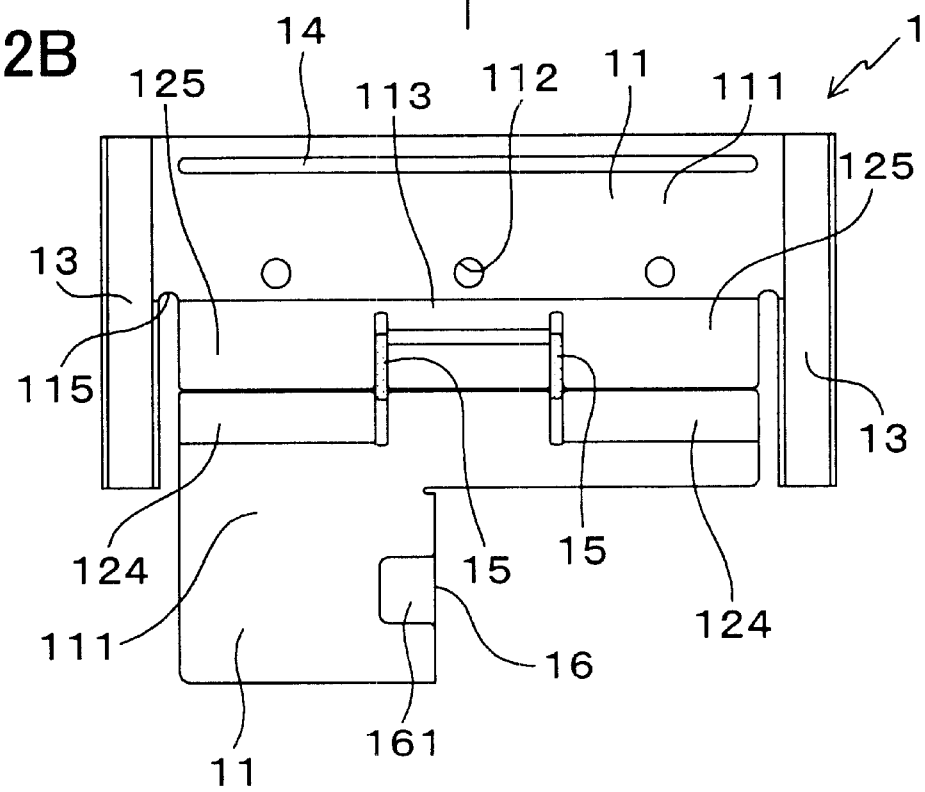

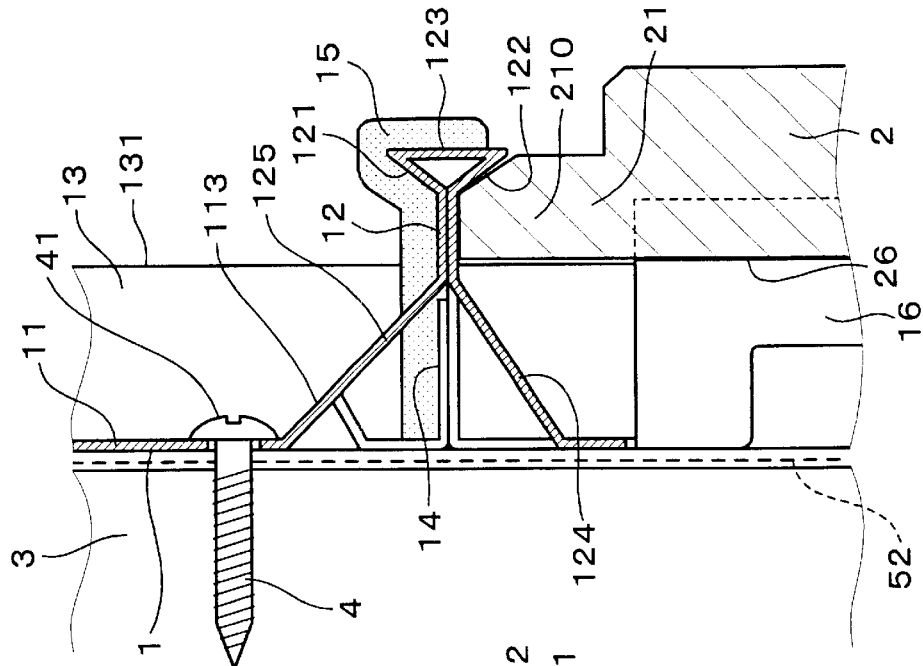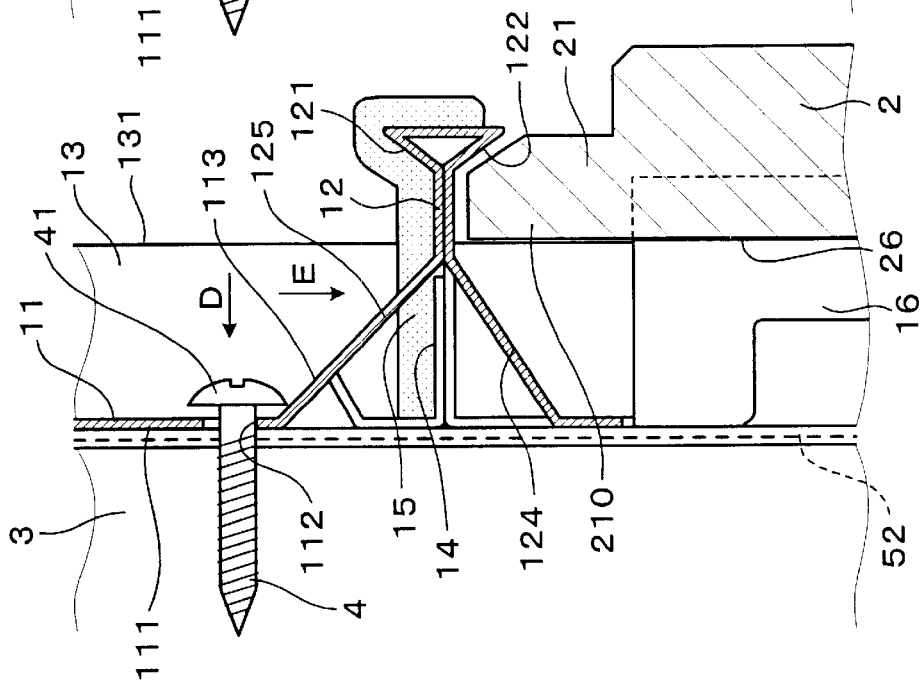

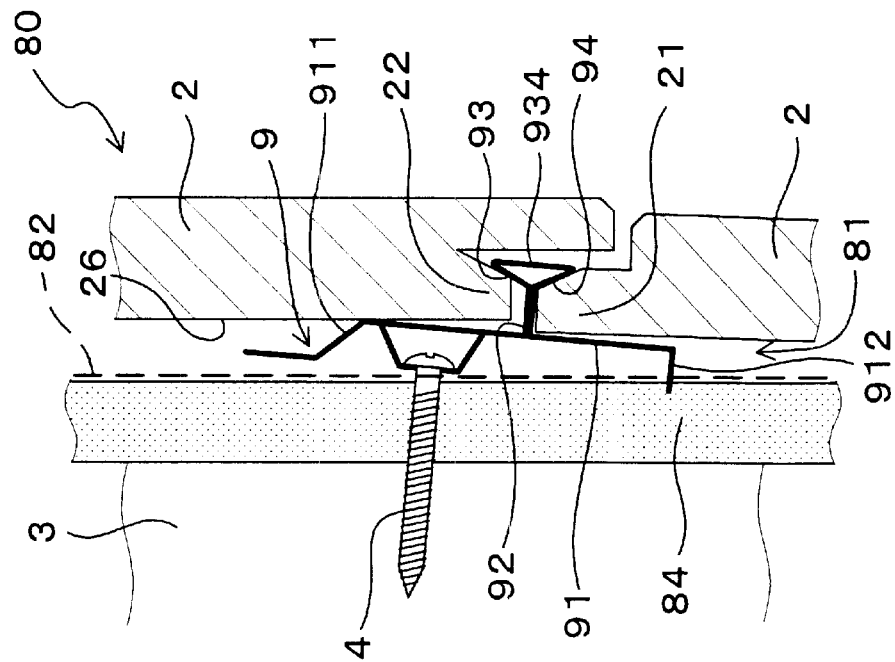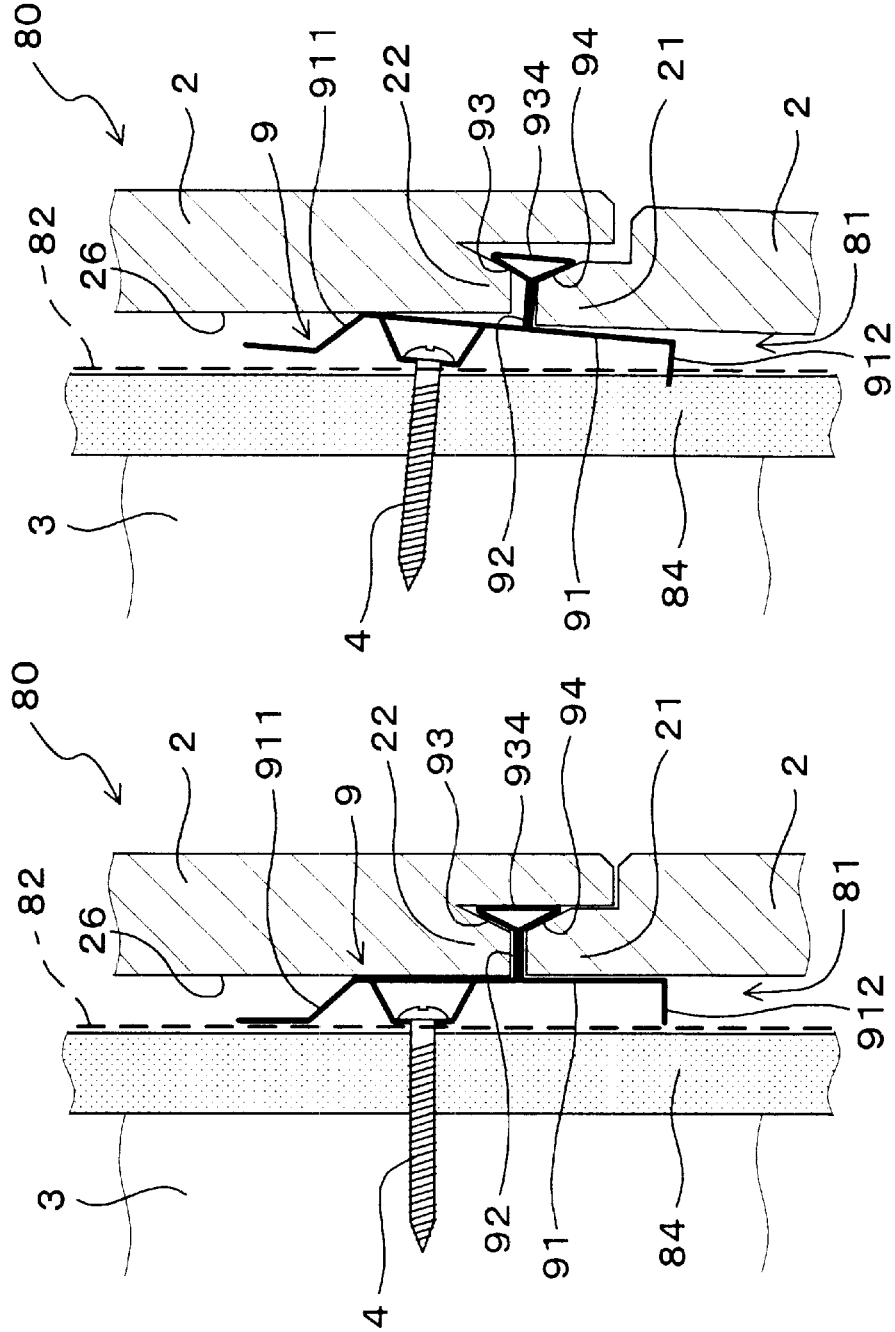

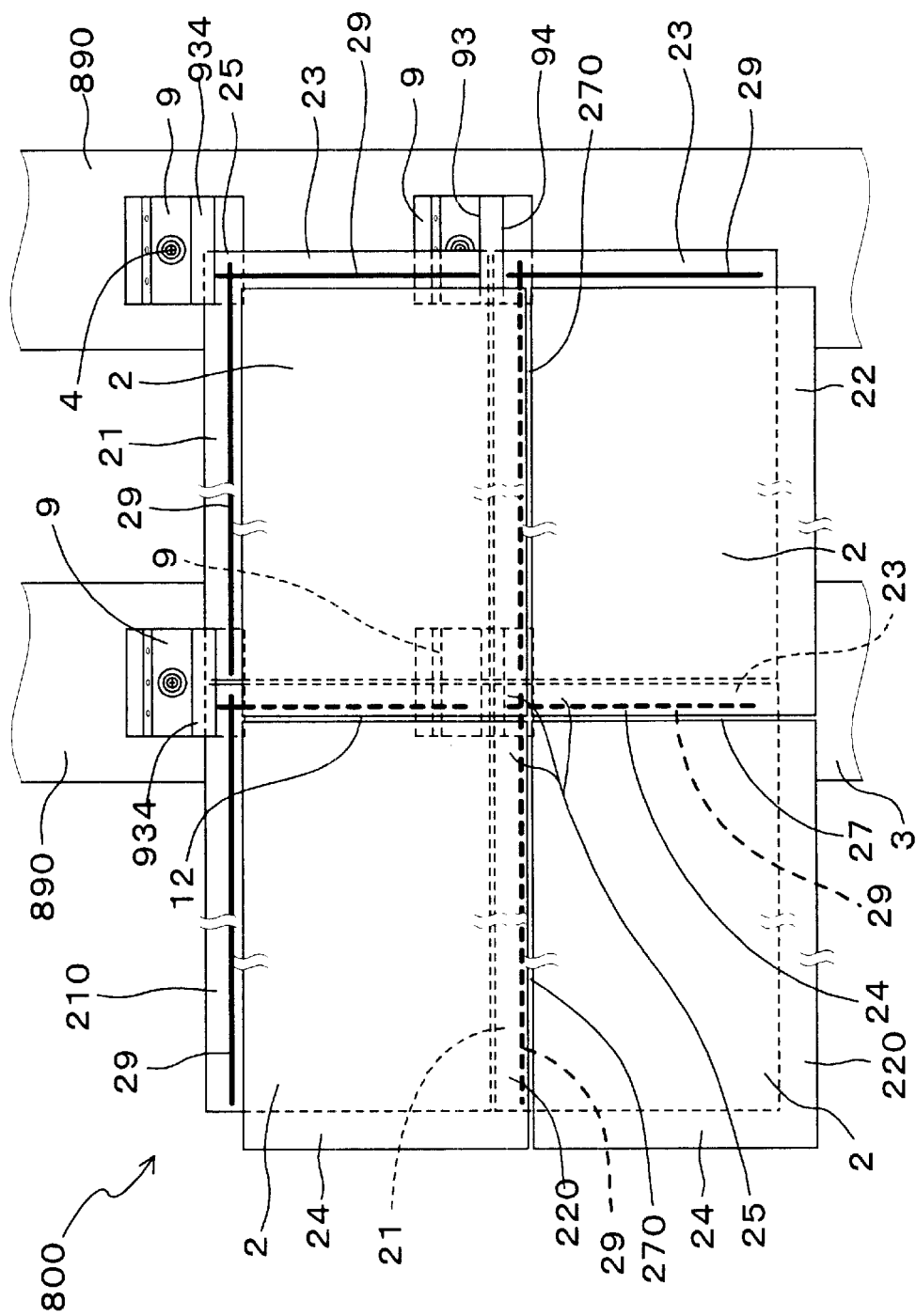

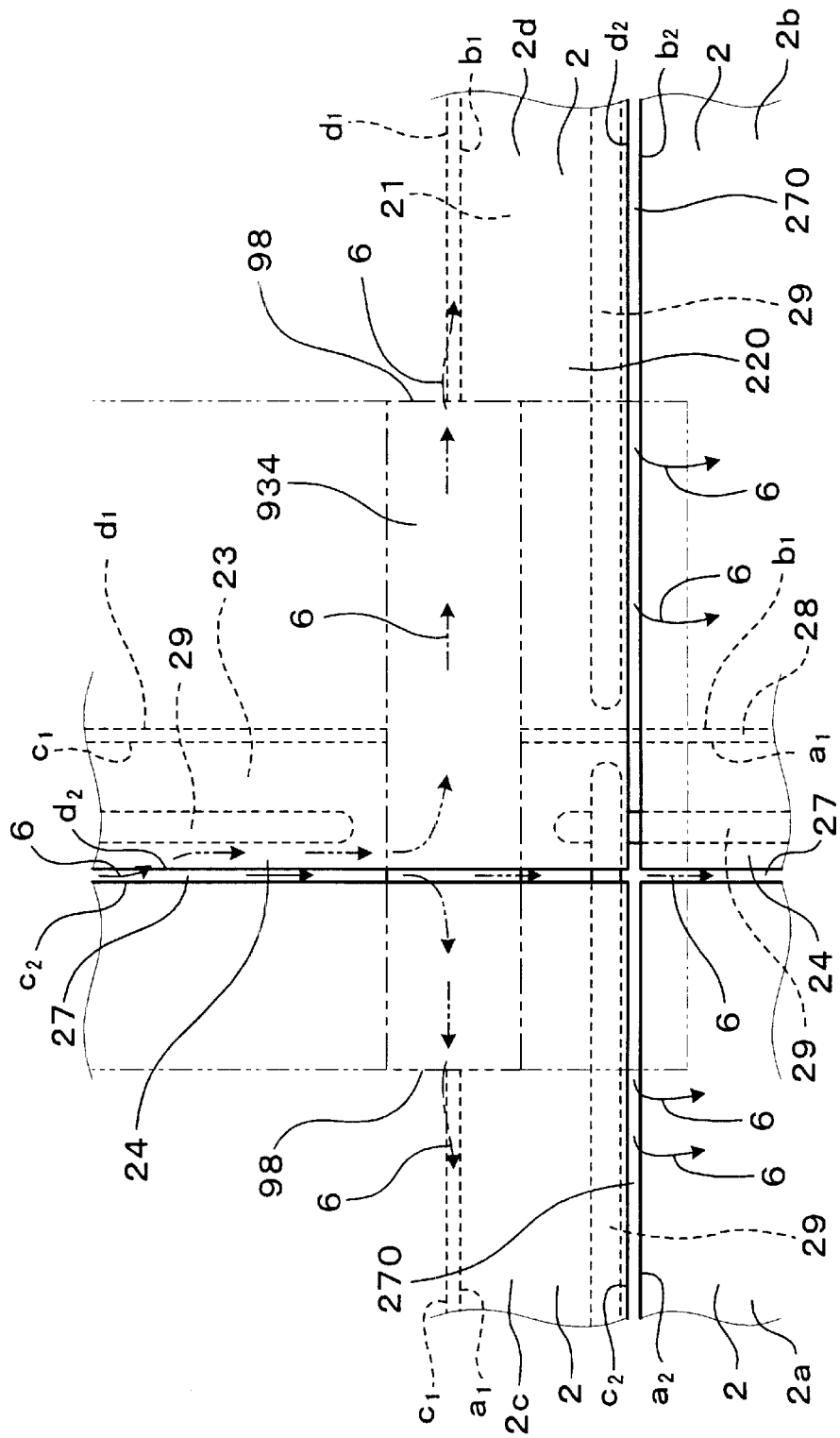

FASTENING SEALING MEMBER AND SIDING BOARDS ATTACHMENT STRUCTURE

CROSS-REFERENCES TO RELATED APPLICATIONS

The present application claims priority under 35 U.S.C. §119 to Japanese Patent Application No. 2001-016242, filed Jan. 24, 2001, entitled "FASTENING SEALING MEMBER AND SIDING BOARDS ATTACHMENT STRUCTURE". The contents of this application are incorporated herein by reference in their entirety.

BACKGROUND OF THE INVENTION

1. Field of the Invention

The present invention relates to a fastening sealing member disposed at upper, lower, left, and right joint portion having four siding boards abutted thereat, fastening the siding boards to a building framework and preventing water leakage; and further relates to a siding boards attachment structure using the same.

2. Discussion of the Background

Conventionally, there are used siding boards attachment structures of type as shown in FIG. 20 by way of example. The figure shows a siding boards attachment structure 8 in which a fastening member 9 is disposed to engage an upper end portion 21 of a siding board 2 positioned on the lower side and a lower end portion 22 of another siding board 2 positioned on the upper side as shown in FIG. 20, and the siding boards 2 and 2 are fixed to a building framework 3 via a furring strip 89 and the like.

As shown in FIGS. 20 and 21, the fastening member 9 has a base plate portion 91, a supporting portion 92, an upper-board engagement portion 93, and a lower-board engagement portion 94. The base plate portion 91 abuts against rear side surfaces 26 of the siding boards 2 disposed vertically. The supporting portion 92 is formed forwardly from the base plate portion 91. The upper-board engagement portion 93 is formed to bend in a slant and upper direction from the supporting portion 92. The lower-board engagement portion 94 is formed to bend in a slant and lower direction from the supporting portion 92. A front flat plate 934 is contiguously provided at tip ends of the upper-board engagement portion 93 and lower-board engagement portion 94.

The base plate portion 91, as shown in FIG. 21, has a sloped portion 911 retracted diagonally and backwardly at its upper part and a lower leg portion 912 bent backwardly by substantially 90 degrees at its lower end.

In the siding boards attachment structure 8, as shown in FIG. 20, a heat insulator 83 as an underlayment such as a sheathing board is fixed to a front face of a framework 3 such as studs. The furring strip 89 is fixed to the framework 3 via a waterproof paper 82 from the front face of the heat insulator 83. Further, on the front face of the furring strip 89, the fastening member 9 is disposed and is fixed to the framework 3 with a screw 4.

The fastening member 9 is fitted to the siding boards 2 in a manner that the upper end portion 21 of the siding board 2 on the lower side is engaged with the lower-board engagement portion 94; the siding board 2 on the upper side is supported by the supporting portion 92, and the lower end portion 22 is engaged with the upper-board engagement portion 93.

In the siding boards attachment structure 8, the furring strip 89 is disposed in the above-described manner, thereby making it possible to provide a ventilation space 81 having a sufficient thickness between the heat insulator 83 and the siding board 2. The ventilation properties are provided in this manner, thereby preventing an occurrence of condensation, preventing corrosion or degradation of the siding board 2 or framework 3 and the like due to water absorption, and improving the durability of the siding boards attachment structure 8.

However, in the siding boards attachment structure 8, since it is required to install the furring strip 89, there is a problem that a large number of works is required and a material cost increases.

Specifically, when the siding boards attachment structure 8 is constructed, it is required to prepare a furring strip 89 having regulated dimensions. Further, a work step of nailing the furring strip 89 to the framework 3 is required.

If the furring strip 89 is not used, as shown in FIG. 22A, there is provided a siding boards attachment structure 80 in which a heat insulator 84 is disposed on the front face of the framework 3, and a fastening member 9 is fixed to the framework 3 via a waterproof paper 82 from the front face of the heat insulator 84.

As the heat insulator 84, for example, there are employed Styrofoam, a sheathing board, an oriented strand board (OSB) and the like.

In the siding boards attachment structure 80, a furring strip is not used. Thus, a ventilation space 81 is not sufficiently secured in consideration of bend of the waterproof paper 82.

In the siding boards attachment structure 80, in the case where a soft heat insulator 84 is used, the fastening member 9 is fixed to the surface of the soft heat insulator 84. Thus, as shown in FIG. 22B, the fastening member 9 is buried into the heat insulator 84, and there is an apprehension that stable fixing cannot be achieved. In particular, as in the fastening member 9, if a contact area between the heat insulator 84 and the lower leg portion 912 is small, the lower leg portion 912 is easily buried into the heat insulator 84. The fastening member 9 may be inclined.

As a result, as shown in FIG. 22B, the siding board 2 fastened by the fastening member 9 is placed in an unstable condition, thereby making it difficult to substantially fix the fastening member 9 to the framework.

As shown in FIG. 23 and FIG. 24, there is a siding boards attachment structure 800 with four-side (left, right, upper and lower sides) shiplap structure in which the fastening member 9 is disposed at a corner portion 25 of each siding board 2, and each siding board 2 is fixed to an underlayment 890.

The siding board 2 with four-side shiplap structure has: an upper underlying tongue portion 210 and a lower overlying tongue portion 220 provided respectively at its upper end portion 21 and lower end portion 22; and a lateral underlying tongue portion 23 and a lateral overlying tongue portion 24 provided at the left and right sides respectively. Then, the lower overlying tongue portion 220 of the siding board 2 on the upper side is attached to be superimposed on the upper underlying tongue portion 210 of the siding board 2 on the lower side, and a lateral overlying tongue portion 24 of the siding board 2 on the right side is attached to be superimposed on a lateral underlying tongue portion 23 of the siding board 2 on the left side.

In addition, as shown in FIG. 23 and FIG. 24, caulking materials 29 are provided at each of the upper underlying tongue portion 210 and the lateral underlying tongue portion 23 of the siding board 2. The lower overlying tongue portion 220 or lateral overlying tongue portion 24 of another siding board 2 is superimposed from the front of this caulking material 29, and the caulking material 29 is pressurized, thereby preventing water penetration into the siding boards attachment structure 9 from a joint gap portion 27 of the siding boards 2.

However, in the siding boards attachment structure 800, although the caulking material 29 is provided, water leakage cannot be always prevented completely. The reasons are stated as follows.

In the siding boards attachment structure 800, the fastening member 9 is installed at a joint portion of the four siding boards 2, i.e., at a portion at which corner portions 25 of four siding boards 2 are disposed to be opposed to each other (FIG. 23). As shown in FIG. 23 and FIG. 24, the supporting portion 92 and the front flat plate 934 of the fastening member 9 are disposed between the lower end portion 22 of the siding board 2 on the upper side and the upper end portion 21 of the siding board 2 on the lower side.

Therefore, the caulking materials 29 provided at the lateral underlying tongue portion 23 of the siding boards 2 on the upper and lower sides are not continuous over the siding boards 2 on the upper and lower sides, and are not connected to each other at the top and bottom of the supporting portion 92 and the front flat plate 934 (FIG. 23 and FIG. 24).

As shown in FIG. 24 and FIG. 25, when rainwater 6 intrudes from a joint gap portion 27 between the siding boards 2 on the left and right sides, the rainwater 6 is inhibited from moving in a transverse direction (the right side in the FIG. 24 and FIG. 25) by means of the caulking material 29, and drops downwardly through the joint gap portion 27. Then, the rain water 6 passes through a front face of the front flat plate 934 of the fastening member 9, and further, moves to the joint gap portion 27 that placed below.

FIG. 25 shows a state in which a joint portion of the four siding boards 2 is viewed from the front direction (front surface side). In FIG. 25, the contour of a backward portion of each siding board 2 is invisible from the forward direction in actuality, which is indicated by dotted line. The backward portion of the siding board whose contour is indicated by dotted lines indicated by signs alto dl is integrated with the forward portion of the siding board whose contour is indicated by solid lines assigned by signs a2 to d2. In addition, signs 2a to 2d represent siding boards having contours a1 to d1 at the backward portion and contours a2 to d2 at the forward portion, respectively.

However, part of the rain water 6 intruding the joint gap portion 27, as shown in FIG. 24 and FIG. 25, flows to the left and right sides through a space between the front face of the front flat plate 934 and the lower overlying tongue portion 220 of the siding board 2 on the upper side. Then, there is an apprehension that the rain water 6 drops from the lateral end portion 98 of the front flat plate 934 to the upper end portion 21 of the siding board 2 on the lower side, and further, intrudes the back side of the siding board 2.

In addition, part of the rain water 6 moving to the left and right sides through the front flat plate 934 moves onto the supporting portion 92 over the upper-board engagement portion 93, and further, moves to both lateral end portions 98 thereof. Then, this rain water 6 also intrudes the back side of the siding board 2 from a lateral end portion 98 of the fastening member 9.

In this manner, there is an apprehension that the siding board 2 or underlayment 890 is corroded or degraded.

The rain water 6 intruding from the joint gap portion 270 between the siding boards 2 on the upper and lower sides is inhibited from its upward movement by a transverse caulking material 29 provided at the upper underlying tongue portion, and is discharged forwardly as it is (FIG. 24 and FIG. 25).

SUMMARY OF THE INVENTION

An object of the present invention is to provide a fastening sealing member that prevents water leakage reliably, ensuring ventilation properties sufficiently, and having a high fastening strength of siding boards; and a siding boards attachment structure using the same.

According to the first aspect of the present invention, there is provided a fastening sealing member disposed at upper, lower, left, and right joint portion of four siding boards and configured to fasten the siding boards to a building framework, comprising: a base plate portion having a flat back side surface; spacing portions formed at both of the left and right ends of the base plate portion, each of which has a front face which is forward from the base plate portion; a central horizontally rising plate portion risen forwardly in the horizontal direction from the base plate portion; a central front plate portion formed in the vertical direction at a front end of the central horizontally rising plate portion; supporting portions risen forwardly in the horizontal direction from the base plate portion at the left and right sides of the central horizontally rising plate portion; an upper-board engagement portion bent upwardly from the front end of the supporting portion; a lower-board engagement portion bent downwardly from the front end of the supporting portion; and a connecting portion provided in the vertical direction between a tip end of the upper-board engagement portion and a tip end of the lower-board engagement portion; wherein the central front plate portion is disposed more backward than the connecting portion, and elastic materials extending to at least an upper end of the central front plate portion are arranged on top faces of the left and right ends of the central horizontally rising plate portion.

Now, advantageous effect of the present invention will be described here.

The fastening sealing member can fasten a siding board to a framework by using it as follows.

Namely, a base plate portion of the fastening sealing member is directly abutted against a framework on its back side surface or is fixed to the framework via a heat insulator or the like. At this time, a lower-board engagement portion of the fastening sealing member is engaged with an upper end portion of a lower siding board.

Next, a lower end portion of an upper siding board is supported by a supporting portion of the fastening sealing member, and is engaged with the upper-board engagement portion. At this time, a rear side surface of the siding board is abutted against a spacing portion of the fastening sealing member.

The fastening sealing member has the spacing portion. Thus, as described above, a siding boards attachment structure is constructed so that the rear side surface of the siding board is abutted against the spacing portion, whereby a ventilation space can be formed at the back side of the siding board. Namely, a sufficient gap is provided between the siding board and the framework, whereby ventilation properties can be ensured.

Therefore, the corrosion and degradation of the siding board or framework can be prevented.

In addition, the siding boards attachment structure is constructed so that the fastening sealing member has the spacing portions at both of the left and right sides each. Thus, the rear side surface of the siding board is attached to be abutted against these spacers, whereby the siding board can be stably supported. Therefore, a siding boards attachment structure can be constructed with its high wind pressure resistance performance or the like and high fastening strength of the siding board.

The fastening sealing member has a base plate portion having its flat rear side surface. Therefore, in the fastening sealing member, the rear side surface can be abutted on a framework or heat insulator and the like in a large contact area. Therefore, in particular, in the case where the fastening sealing member is abutted against a soft underlayment such as a heat insulator and is fixed to the framework, the fastening sealing member is not buried into the underlayment and the siding boards can be stably attached.

Therefore, a siding boards attachment structure having its excellent wind pressure resistance performance and high fastening strength of the siding boards can be constructed.

The fastening sealing member has the elastic materials on a top face at the left and right end portions of the central horizontally rising plate portion. Therefore, the lower end portion of the siding board disposed above the fastening sealing member comes into close contact with the elastic material.

In this manner, the rain water that has dropped at the central horizontally rising plate portion of the fastening sealing member and tends to move to the left and right sides, is dammed by the elastic materials.

Further, the central front plate portion in the fastening sealing member is disposed more backward than the connecting portion. Then, the rear side surface of the lower overlying tongue portion of the upper siding board abuts against the connecting portion. Thus, a forward gap is formed between the rear side surface of the lower overlying tongue portion of the siding board and the central front plate portion.

In this manner, a space formed among the horizontally rising plate portion, the elastic materials at the left and right sides of the horizontally rising plate portion and the lower end portion of the siding board constitutes a water channel communicating with the forward part of the siding boards attachment structure together with the forward gap.

Therefore, the rain water which has been dropped at the central horizontally rising plate portion of the fastening sealing member and is dammed by the elastic materials, is positively discharged forwardly of the wall face through the water channel. Therefore, the rain water does not intrude the inside of the siding boards attachment structure.

In this way, by using the fastening sealing member, the rain water can be reliably prevented from intruding the inside of the siding boards attachment structure, whereby the corrosion or degradation of the siding board, underlayment and the like can be reliably prevented. This water penetration preventing function will be described in detail in the embodiments described later.

As described above, according to the present invention, a fastening sealing member preventing water leakage reliably, ensuring ventilation properties sufficiently and having high fastening strength of siding boards can be provided.

According to the second aspect of the invention, there is provided a siding boards attachment structure in which a fastening sealing member is disposed at upper, lower, left, and right joint portion of four siding boards, and the siding boards are fastened to a building framework, wherein the fastening sealing member comprises: a base plate portion having a flat rear side surface; spacing portions formed at both of the left and right ends of the base plate portion, each of which has a front face which is forward from the base plate portion; a central horizontally rising plate portion risen forwardly in the horizontal direction from the base plate portion; a central front plate portion formed in the vertical direction at a front end of the central horizontally rising plate portion; supporting portions risen forwardly in the horizontal direction from the base plate portion at the left and right sides of the central horizontally rising plate portion; an upper-board engagement portion bent upwardly from the front end of the supporting portion; a lower-board engagement portion bent downwardly from the front end of the supporting portion; and a connecting portion provided in the vertical direction between a tip end of the upper-board engagement portion and a tip end of the lower-board engagement portion; wherein the central front plate portion is disposed more backward than the connecting portion, and elastic materials extending to at least an upper end of the central front plate portion are arranged on top faces of the left and right ends of the central horizontally rising plate portion; and wherein the fastening sealing member is fixed to the framework, the base plate portion abuts against the framework, the spacing portions abut against the rear side surfaces of the siding board, an upper end portion of the siding board disposed below the fastening sealing member is engaged with a lower-board engagement portion of the fastening sealing member, a lower end portion of the siding board disposed above the fastening sealing member is placed on the supporting portion of the fastening sealing member and is engaged with the upper-board engagement portion, and the elastic materials of the fastening sealing member come into close contact with a lower end portion of the upper siding board.

In the siding boards attachment structure, a base plate portion having a flat rear side surface is abutted against the framework, thereby fixing the fastening sealing member stably. In addition, the rear side surface of the siding board is abutted against spacing portions formed at both of the left and right sides of the base plate portion, and thus a siding board can be stably fixed.

Therefore, a siding boards attachment structure having its excellent wind pressure resistance performance or the like and higher fastening strength of siding boards can be obtained.

The rear side surface of the siding board is abutted against the spacing portion, and thus, a ventilation space with a sufficient thickness can be formed at the back side of the siding board. Therefore, a siding board attachment structure with its excellent ventilation properties can be provided.

The elastic material of the fastening sealing member comes into close contact with the lower end portion of the sidling board disposed upwardly. In this manner, the rain water that has dropped at the central horizontally rising plate portion of the fastening sealing member and tends to move to the left and right sides, is dammed by the elastic materials.

In addition, in the siding boards attachment structure, as described above, a forward gap is formed between the rear side surface of the lower overlying tongue portion of the siding board and the central front plate portion. In this manner, a space formed among the central horizontally rising plate portion, the elastic materials at the left and right end portions of the central horizontally rising plate portion and the lower end portion of the siding board constitutes a water channel communicating with the forward part of the siding boards attachment structure together with the forward gap.

Therefore, the rainwater that has dropped at the central horizontally rising plate portion of the fastening sealing member and is dammed by the elastic materials, is positively discharged forwardly of the wall face through the water channel. Therefore, the rain water does not intrude the inside of the siding boards attachment structure.

As described above, according to the present invention, a siding boards attachment structure preventing water leakage reliably, ensuring ventilation properties sufficiently and having high fastening strength of siding boards can be provided.

According to the third of the invention, there is provided a siding boards attachment structure in which a fastening sealing member is disposed at upper, lower, left, and right joint portion of four siding boards, the siding boards are fastened to a building framework, and a heat insulator is fixed to a front face of the framework; wherein the fastening sealing member comprises: a base plate portion having a flat rear side surface; spacing portions formed at both of the left and right ends of the base plate portion, each of which has a front face which is forward from the base plate portion; a central horizontally rising plate portion risen forwardly in the horizontal direction from the base plate portion; a central front plate portion formed in the vertical direction at a front end of the central horizontally rising plate portion; supporting portions risen forwardly in the horizontal direction from the base plate portion at the left and right sides of the central horizontally rising plate portion; an upper-board engagement portion bent upwardly from the front end of the supporting portion; a lower-board engagement portion bent downwardly from the front end of the supporting portion; and a connecting portion provided in the vertical direction between a tip end of the upper-board engagement portion and a tip end of the lower-board engagement portion, wherein the central front plate portion is disposed more backward than the connecting portion, and elastic materials extending to at least an upper end of the central front plate portion are arranged on top faces of the left and right ends of the central horizontally rising plate portion; and wherein the fastening sealing member is fixed to the framework, the base plate portion abuts against the heat insulator and the spacing portions abut against the rear side surfaces of the siding boards, an upper end portion of the siding board disposed below the fastening sealing member is engaged with a lower-board engagement portion of the fastening sealing member, a lower end portion of the siding board disposed above the fastening sealing member is placed on the supporting portion of the fastening sealing member and is engaged with the upper-board engagement portion, and the elastic materials of the fastening sealing member come into close contact with a lower end portion of the upper siding board (see FIGS. 18 and 19).

In the siding boards attachment structure, the heat insulator can be fixed from the front face of the framework, and thus, a siding boards attachment structure having a heat insulation effect can be easily constructed.

In addition, in the case of the siding board attachment structure, when a base plate portion of the fastening sealing member is abutted against a surface of the heat insulator, the rear side surface of the base plate portion is flat and a contact area relevant to the heat insulator is large. Thus, even if the heat insulator is soft, the base plate portion is not buried into the heat insulator. Therefore, the fastening sealing member can be stably fixed to the framework via the heat insulator.

As in the second aspect of the present invention, there can be provided a siding boards attachment structure having high strength and excellent ventilation properties, and preventing water leakage reliably.

BRIEF DESCRIPTION OF THE DRAWINGS

A more complete appreciation of the invention and many of the attendant advantages thereof will become readily apparent with reference to the following detailed description, particularly when considered in conjunction with the companying drawings, in which:

FIG. 2A is a front view showing the fastening sealing member in the first embodiment;

FIG. 2B is a rear view showing the fastening sealing member in the first embodiment;

FIG. 12A and FIG. 12B are illustrative views illustrating functions of a sloped portion provided at the fastening sealing member in the first embodiment;

FIG. 22A is a vertical cross section showing a siding boards attachment structure in which a fastening member is abutted against a heat insulator in another conventional example;

FIG. 22B is a vertical cross section showing an inconvenience of FIG. 22A;

FIG. 23 is a front view showing a siding boards attachment structure in a conventional example;

FIG. 25 is an illustrative front view illustrating a flow of a rain water at the periphery of a fastening member in a conventional example.

DESCRIPTION OF THE PREFERRED EMBODIMENTS

The elastic material is highly elastic and has waterproof properties. In addition, the central horizontally rising plate portion is extended forwardly of the spacing portion. In addition, in the specification, the word "forward" denotes an outward direction of a building, and the word "backward" denotes an inward direction of a building. With respect to the fastening sealing member or the like, in a state in which the member is mounted on a framework, the expressions "front", "back", "upper", "lower", "horizontal", and "vertical" or the like are used.

Figure 7:
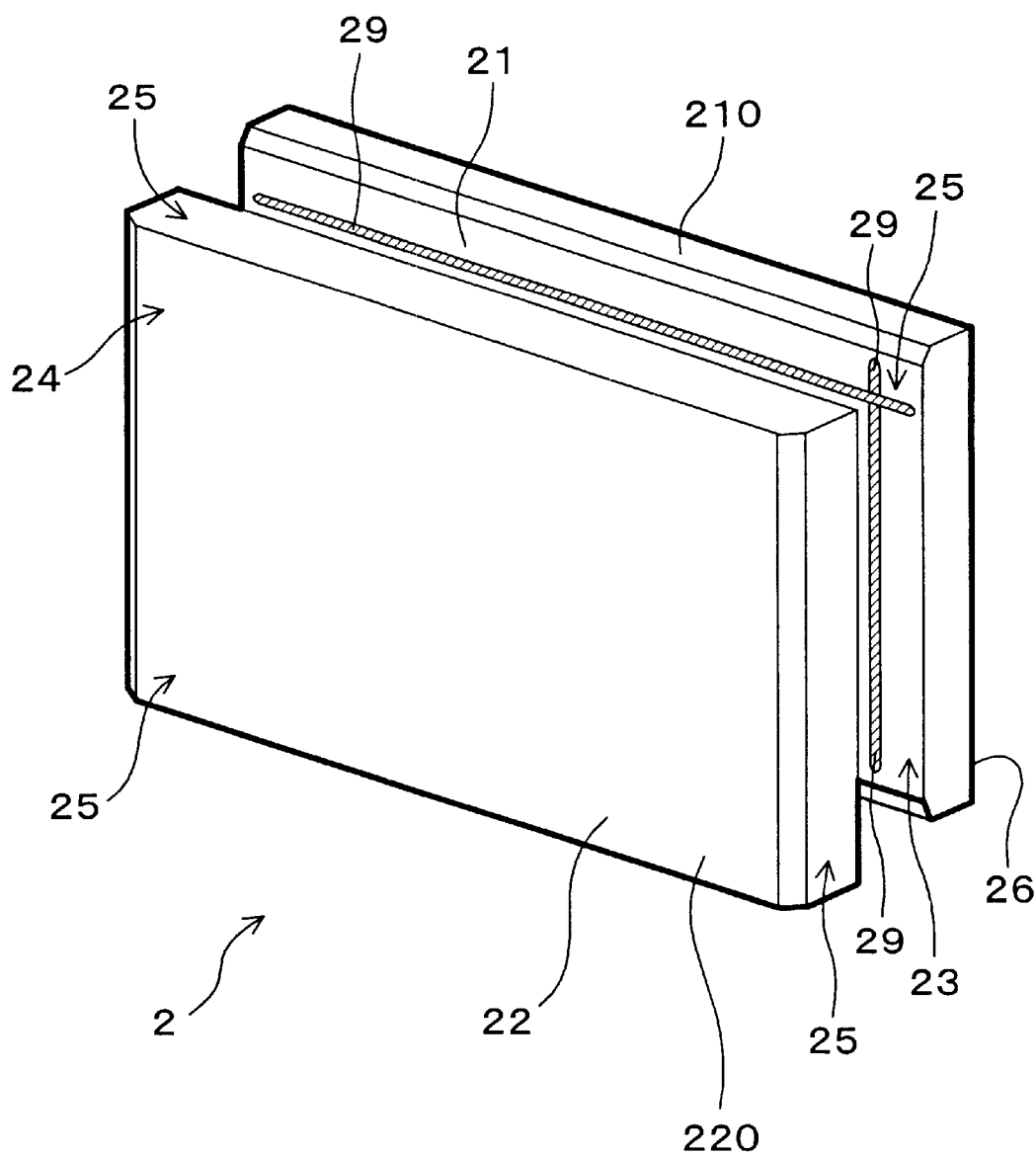
FIG. 7 is a perspective view showing a siding board in the first embodiment.

The siding boards are so called four-side (left, right, upper and lower sides) shiplap structure that has: an upper underlying tongue portion provided at an upper end portion; a lower overlying tongue portion provided at a lower end portion; and a lateral underlying tongue portion and a lateral overlying tongue portion provided at the left and right sides as shown in FIG. 7. Then, the siding boards attachment structure is constructed so that the lower overlying tongue portion of the upper siding board is attached to be superimposed on the upper underlying tongue portion of the lower siding board, and the lateral overlying tongue portion of the right siding board is attached to be superimposed on the lateral underlying tongue portion of the left siding board.

It is preferable that the elastic material in the fastening sealing member is provided extending from an upper end of the central front plate portion to the lower end of the front face of the central front plate portion. In this manner, water leakage can be prevented more reliably.

Next, it is preferable that a vertically rising plate portion risen forwardly in the vertical direction is provided at the lower portion of the base plate portion.

When a siding board is constructed by using the fastening sealing member, the lateral end portion of the lower siding board can be abutted against the vertically rising plate portion. For example, in the case where the siding boards are attached from the left side in order, the right lateral end portion of the siding board can be abutted against the vertically rising plate portion.

In this manner, the positions in the transverse direction of the siding boards can be precisely aligned with each other, and the construction properties are remarkably improved. Moreover, the displacement of the aligned siding boards in the traverse direction after construction can be prevented, thus making it possible to stabilize a siding boards attachment structure over a long period.

Next, it is preferable that the elastic material is a rubber elastic development material or a foam body. In this manner, a fastening sealing member which prevents intrusion of rain water more reliably can be provided.

As the rubber elastic development material or the foam body, there is, for example, a rubber foam made of an ethylene rubber or EPDM (ethylene propylene rubber) or the like or a synthetic resin foam body such as polyethylene.

In addition, it is preferable that the foam body is made of a foam body with closed cells.

It is preferable that each of the spacing portions has a front face forwardly formed 15 to 20 mm away from the rear side surface of the base plate portion.

In this manner, the siding board can be fixed to be sufficiently away from the framework or an underlayment, for example, the heat insulator. Consequently, a ventilation space having a sufficient thickness can be formed at the back of the siding boards.

When the distance between the front face of each of the spacing portions and the rear side surface of the base plate portion is less than 15 mm, ventilation space having a sufficient thickness cannot be formed. Therefore, there is an apprehension that ventilation properties may not be sufficient. On the other hand, when the distance between the front face of each of the spacing portions and the rear side surface of the base plate portion is more than 20 mm, there is an apprehension that the portion on which the load of the siding board is supported is too forward of the fastening sealing member, thereby making it difficult for the fastening sealing member to fix the siding board to be stable.

It is preferable that a lower reinforcement portion for reinforcing the supporting portion from the lower position is formed between the supporting portion and a lower portion of the base plate portion, which is downward from the supporting portion.

In this manner, the strength of the supporting portion is increased, thereby enabling a heavy siding board to be supported. When the spacing portions are formed to protrude larger, the supporting portion must be formed to protrude more forwardly than the spacing portion. Also in this case, the supporting portion can bear the load of the siding board sufficiently.

It is preferable that an upper reinforcement portion for reinforcing the supporting portion from the upper position is formed between the supporting portion and an upper portion of the base plate portion, which is upward from the supporting portion.

Also in this case, the strength of the supporting portion for the load of the siding board is improved.

It is preferable that the base plate portion comprises screw holes through which a screw for fixing the fastening sealing member to the framework is inserted; a sloped portion protruded forwardly and downwardly from the base plate portion is formed below the screw hole; and when the screw inserted through the screw hole is screwed into the framework, a head portion of the screw abuts against the sloped portion, thereby exerting a force downwardly thrusting the fastening sealing member (as shown in FIG. 12A and FIG. 12B).

According to the above structure, the lower siding board can be fixed to the framework more securely by means of the fastening sealing member.

In this case, it is preferable that the sloped portion is integrated with the upper reinforcement portion.

Thereby, the fastening sealing member that can be easily manufactured can be obtained.

It is preferable that the fastening sealing member is integrally formed by bending a metal plate.

Thereby, the fastening sealing member that can be easily manufactured and is cheap can be obtained.

The abutment state of the base plate portion against the framework includes a state in which a waterproof paper or the like is interposed between the base plate portion and the framework as well as a state in which the base plate portion is directly brought into contact with the framework. Namely, the abutment state used here denotes a state in which a majority of the pressure from the base plate portion is applied to the framework.

For the heat insulator, for example, a styrofoam, a sheathing board, an OSB (an oriented strand board), styrene board and the like may be used.

Alternatively, the siding boards attachment structure may be constructed by an external insulation technique.

It is preferable that a vertically rising plate portion risen forwardly in the vertical direction is provided at the lower portion of the base plate portion of the fastening sealing member, and the lateral end portion of the lower siding board abuts against the vertically rising plate portion.

In this manner, a displacement of the aligned left and right siding boards after construction can be reliably prevented.

It is preferable that the front face of each of the spacing portions is formed at a position that is more forward than the rear side surface of the base plate portion by 15 to 20 mm.

In this manner, the ventilation properties of the siding boards attachment structure can be improved. This improvement prevents siding boards, the framework and the like, from being corroded and deteriorated more reliably.

First Embodiment

A fastening sealing member and a siding boards attachment structure using the same according to one embodiment of the present invention, will be described here with reference to FIG. 1 to FIG. 17.

Figure 1:
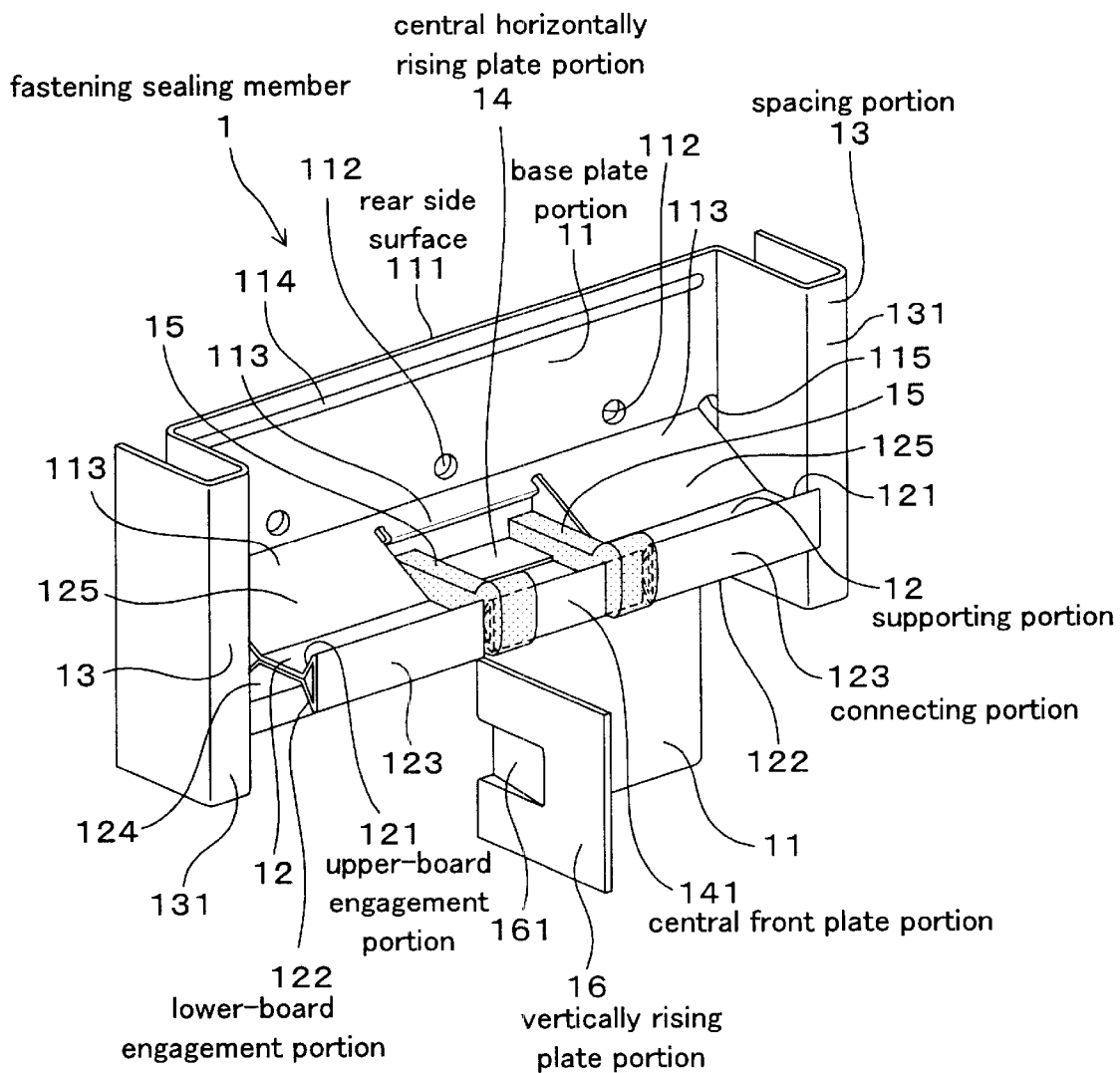
FIG. 1 is a perspective view showing a fastening sealing member in a first embodiment.
Figure 3A:
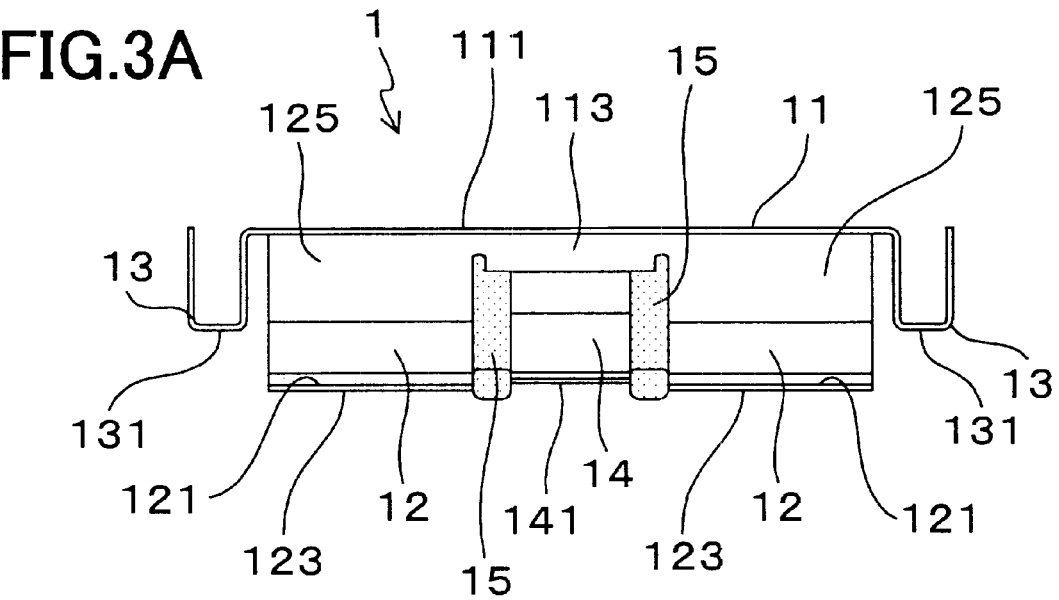
FIG. 3A is a top view showing the fastening sealing member in the first embodiment.
Figure 3B:
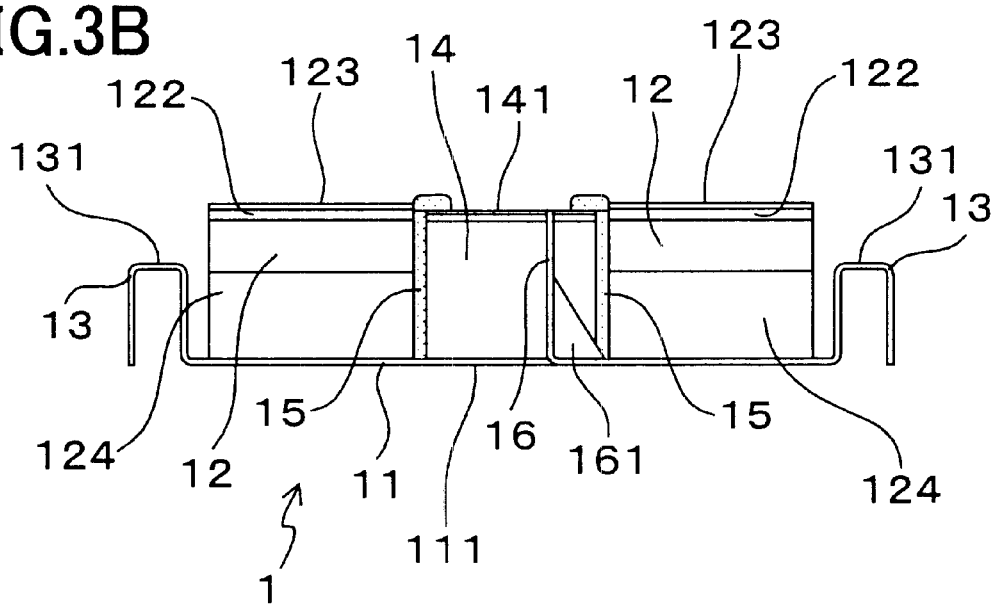
FIG. 3B and a bottom view showing the fastening sealing member in the first embodiment.
Figure 4A:
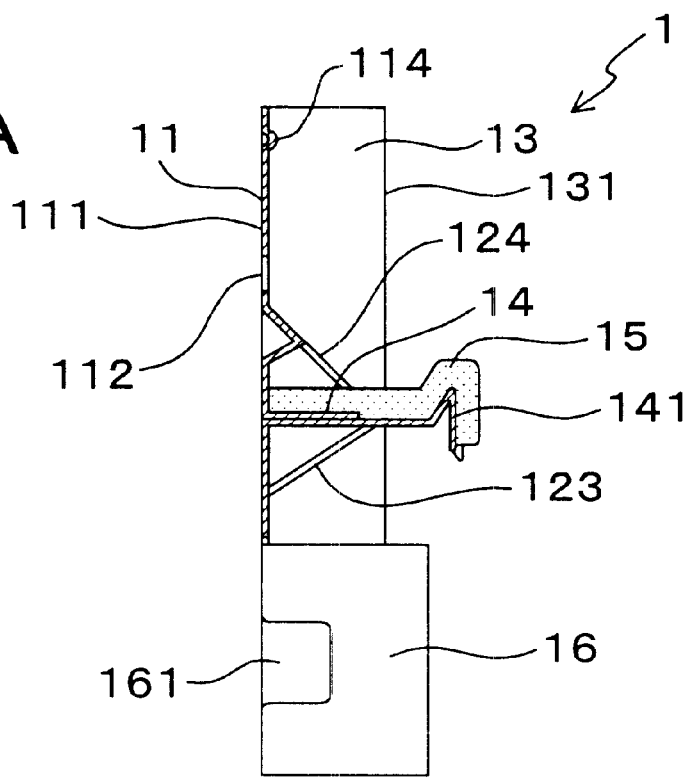
FIG. 4A is a sectional view taken along line A—A of FIG. 2A.
Figure 4B:
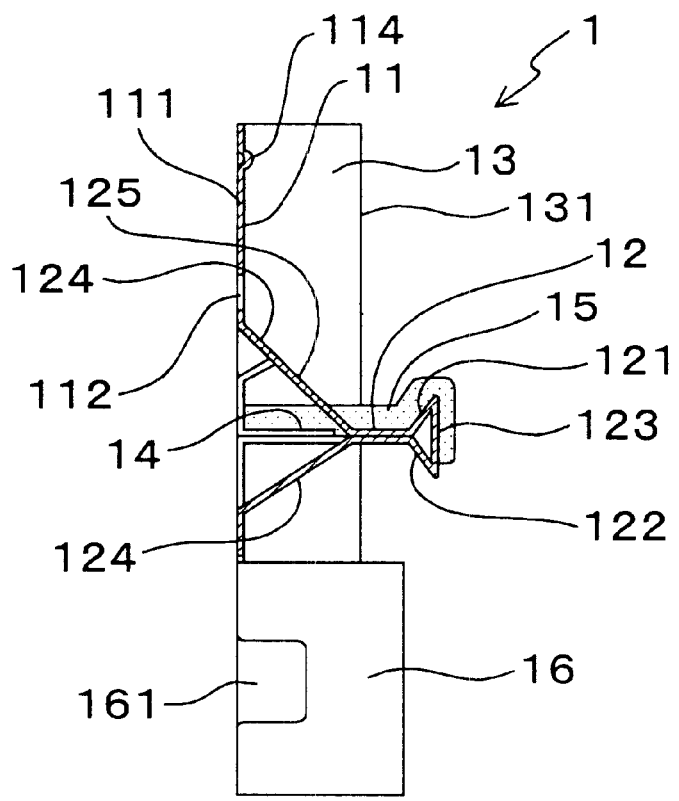
FIG. 4B is a sectional view taken along line B—B of FIG. 2A.
Figure 8:
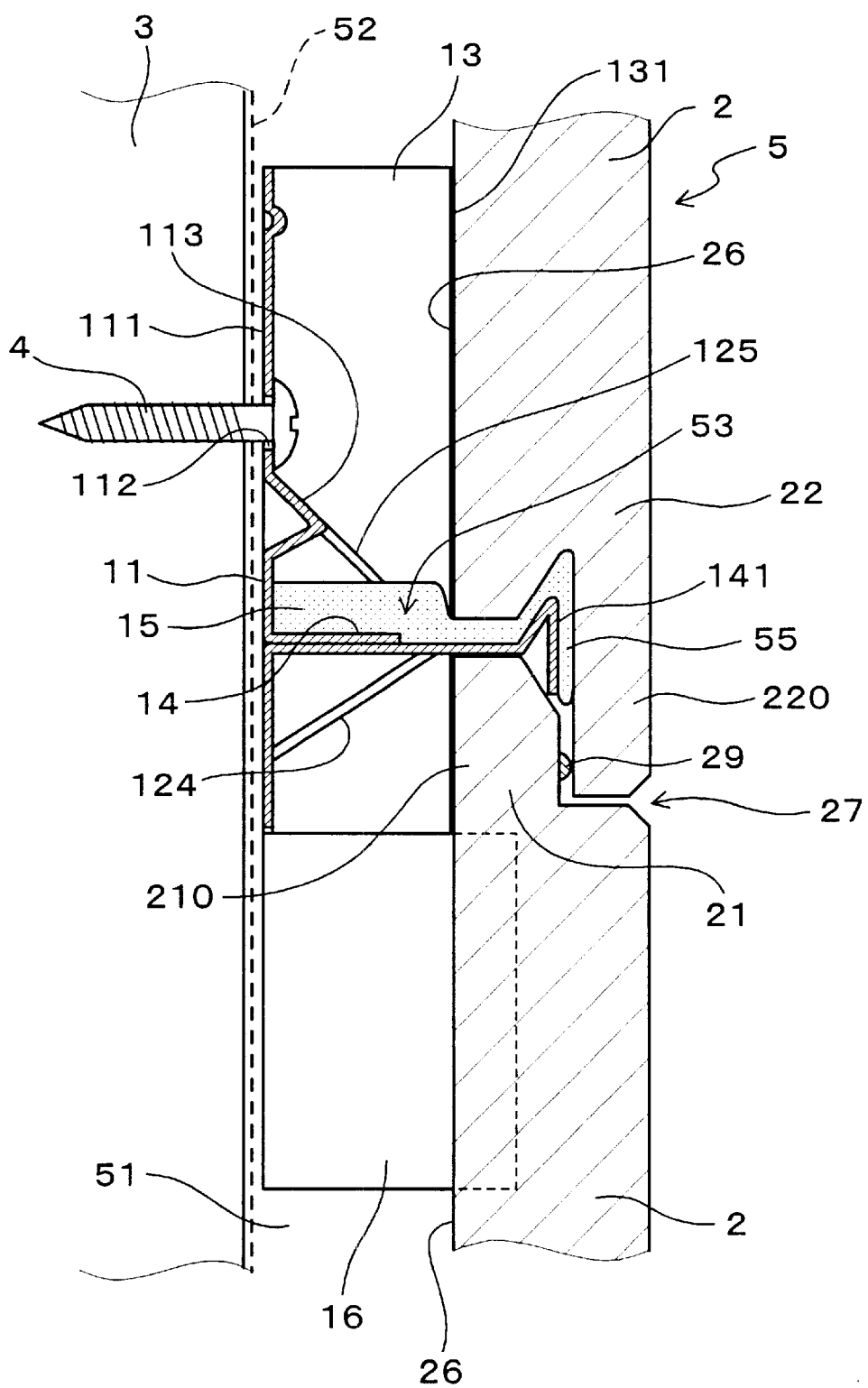
FIG. 8 is a sectional view showing the siding boards attachment structure that corresponds to FIG. 4A in the first embodiment.
Figure 9:
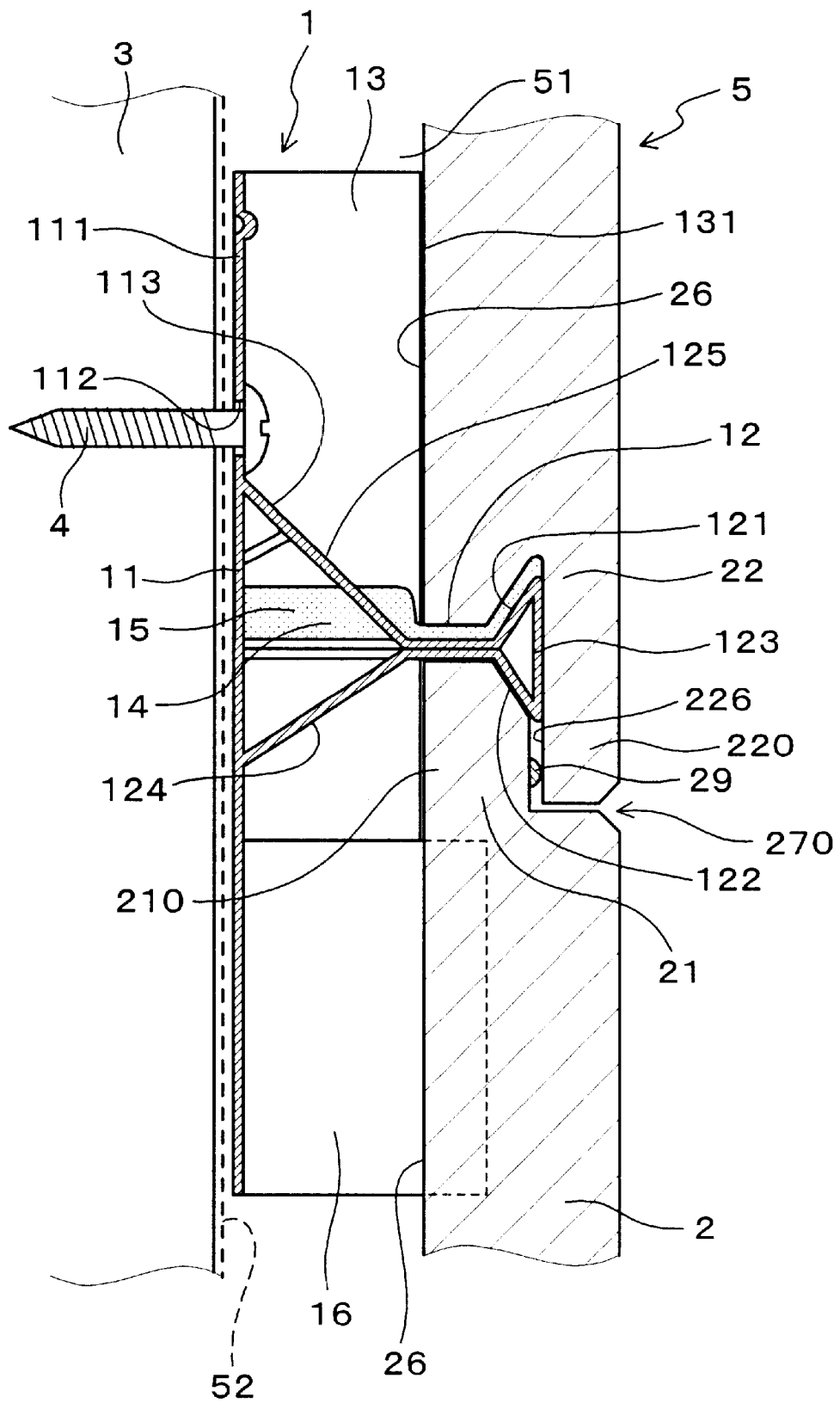
FIG. 9 is a sectional view showing the siding boards attachment structure that corresponds to FIG. 4B.
Figure 10:
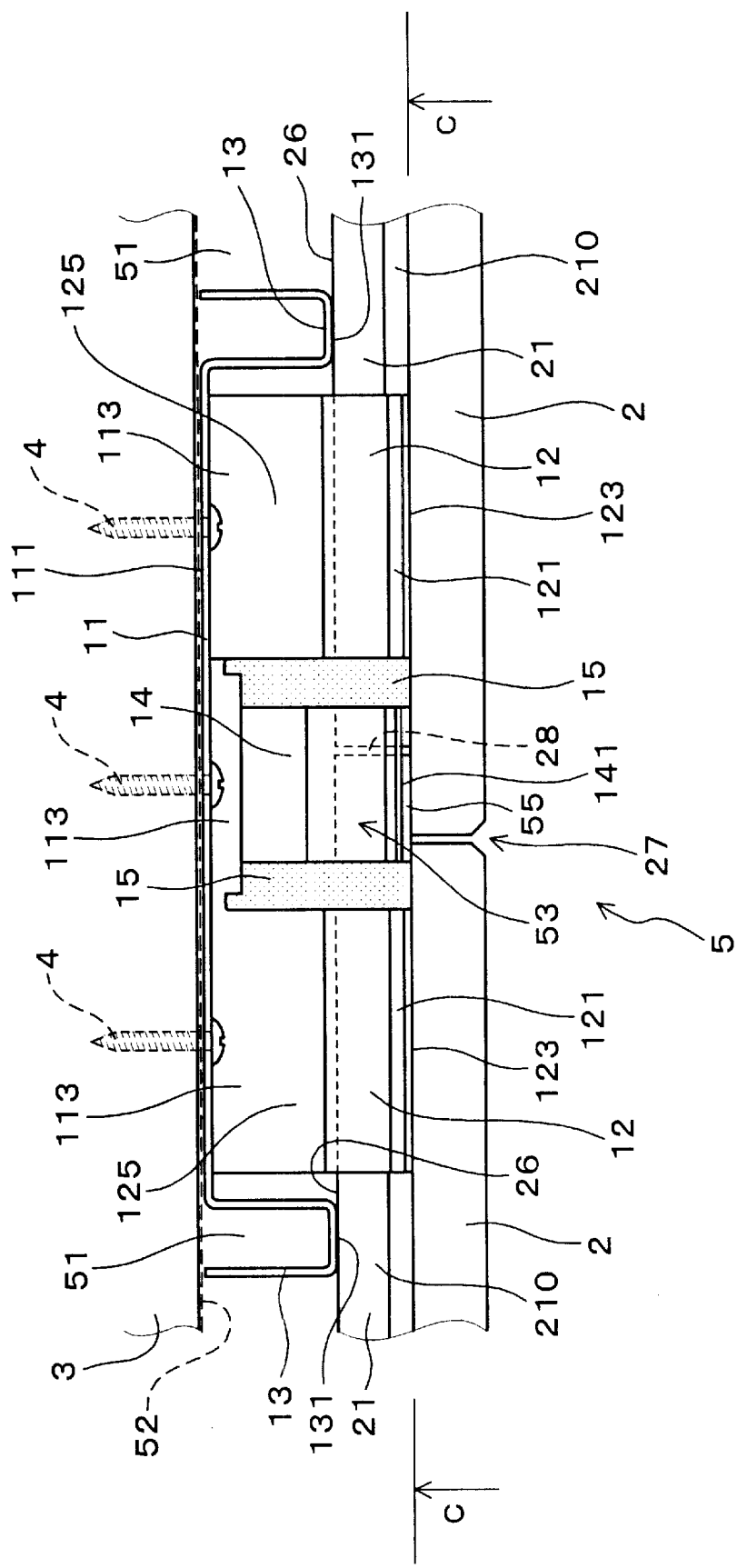
FIG. 10 is a horizontal cross section showing the siding boards attachment structure in the first embodiment.
Figure 11:
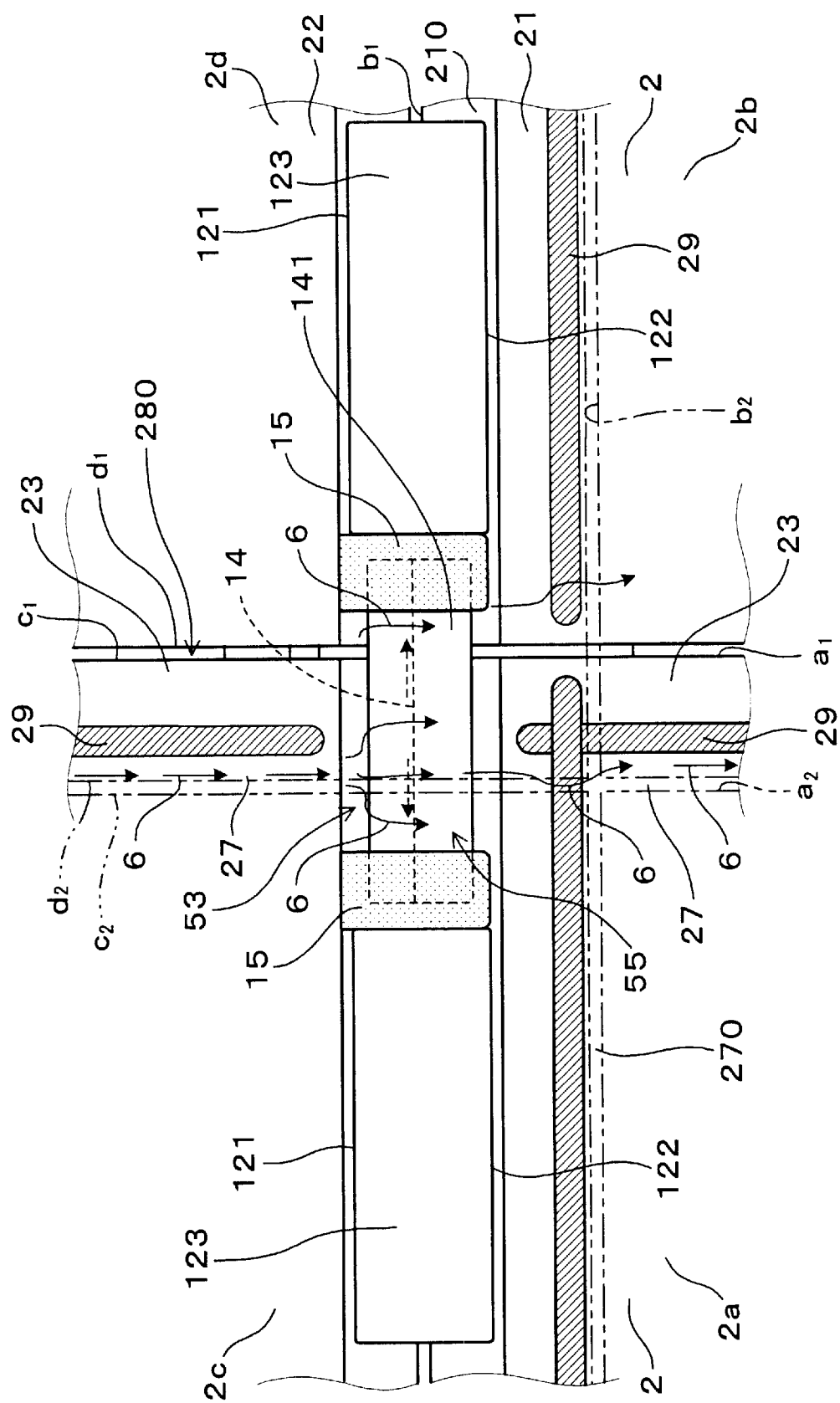
FIG. 11 is an illustrative view illustrating a flow of a rainwater that corresponds to the sectional view taken along line C—C of FIG. 10 in the first embodiment.

FIG. 1 is a perspective view showing the fastening sealing member 1. FIG. 2A and FIG. 2B are a front view and a rear view, respectively, each of which shows the fastening sealing member 1. FIG. 3A and FIG. 3B are a top view and a bottom view, respectively, each of which shows the fastening sealing member 1. FIG. 4A and FIG. 4B are sectional views taken along lines A—A and B—B of FIG. 2A, respectively. FIG. 8 is a sectional view showing a siding boards attachment structure 5 to which FIG. 4A belongs. FIG. 9 is a sectional view showing the siding boards attachment structure 5 to which FIG. 4B belongs. FIG. 10 is a horizontal cross section showing the siding boards attachment structure 5 viewed from the top. FIG. 11 is a sectional view showing the siding boards attachment structure 5 taken along line C—C of FIG. 10.

The double-dot dash line shown in FIG. 11 represents a contour of a forward portion (a designed surface) of each siding board 2. The forward portion of the siding board whose contour is indicated by double-dot dash line to which signs a2 to d2 are assigned is integrated with a backward portion of the siding board whose contour is indicated by solid line to which signs a1 to d1 are assigned, respectively. In addition, signs 2a, 2b, 2c, and 2d represents siding boards disposed at the lower left, lower right, upper left, and upper right of the fastening sealing member 1 that is defined as a reference, respectively. Namely, the siding boards 2a to 2d are siding boards having the contours a1 to d1 at the backward portion and the contours a2 to d2 at the forward portion.

Figure 5:
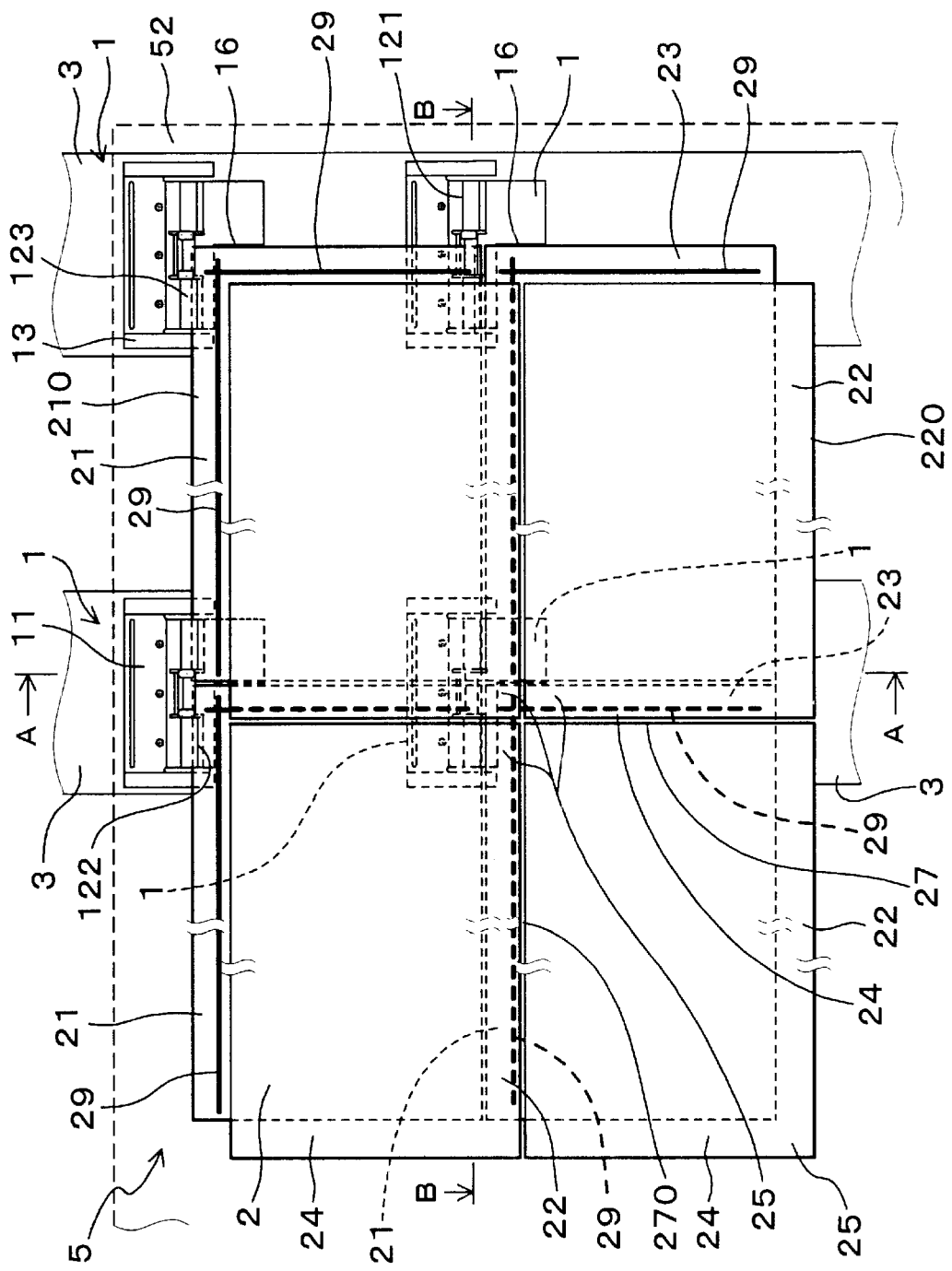
FIG. 5 is a front view showing a siding boards attachment structure in the first embodiment.
Figure 6:
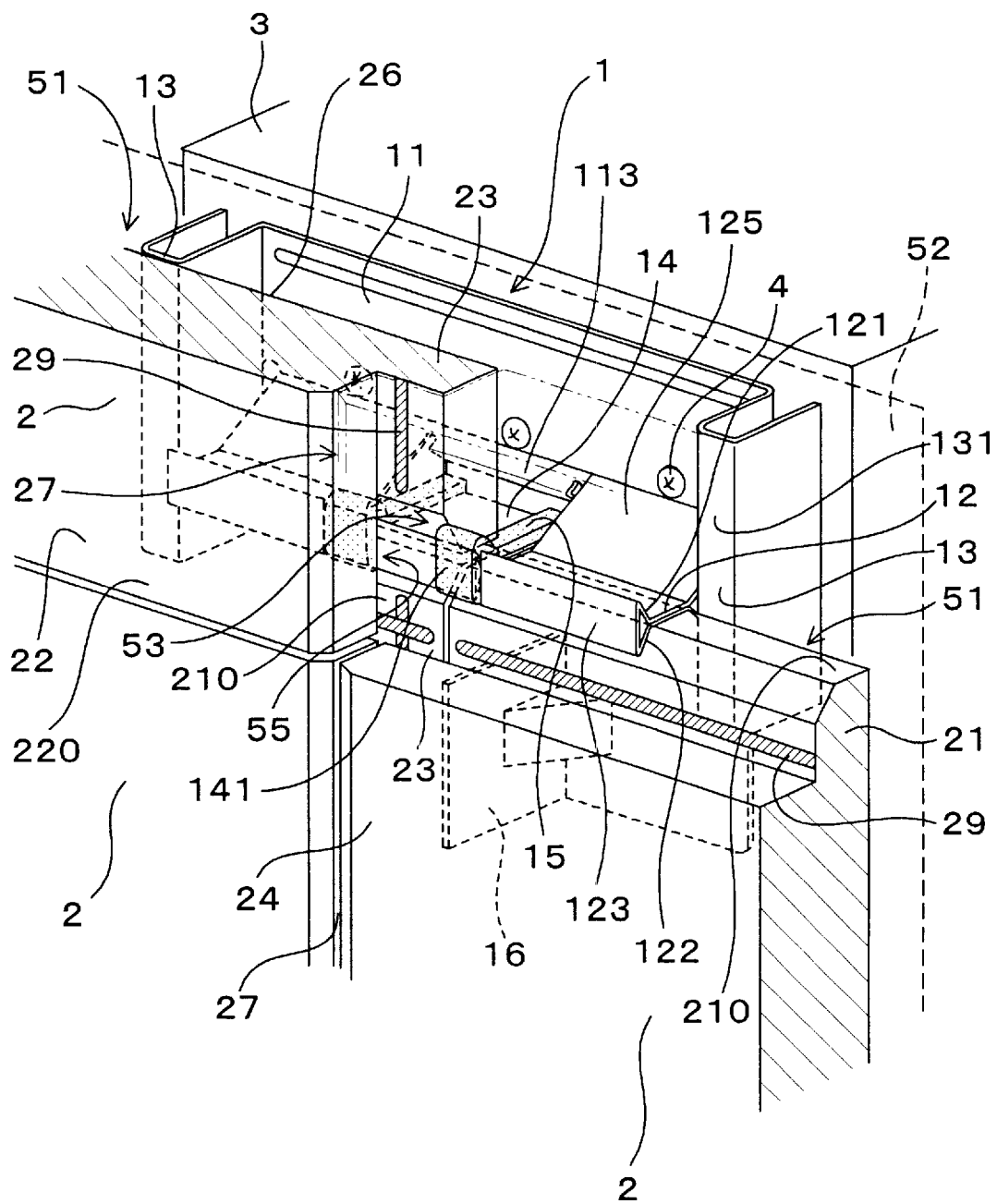
FIG. 6 is a perspective view showing the siding boards attachment structure in the first embodiment.

The fastening sealing member 1 of the present embodiment, as shown in FIG. 5 and FIG. 6, is disposed at the upper, lower, left, and right joint portions at which four siding boards 2 are abutted each other, and the siding boards 2 are fastened to the building framework 3.

The fastening sealing member 1, as shown in FIG. 1 to FIG. 4B, has: a base plate portion 11 having a flat rear side surface 111; and spacing portions 13 formed more forwardly than the base plate portion 11 at the left and right ends of the base plate portion 11. A central horizontally rising plate portion 14 is risen forwardly in the horizontal direction from the base plate portion 11, and a central front plate portion 141 is formed in the vertical direction at the front end of the central horizontally rising plate portion 14.

The central horizontally rising plate portion 14 is projecting forwardly from the base plate portion 11. The front end of the central horizontally rising plate portion 14 has the central front plate portion 141 as shown in FIG. 1.

In addition, the central horizontally rising plate portion 14 may be made of a steel plate bent forwardly from the base plate portion 11.

The supporting portions 12 are risen in the horizontal direction forwardly from the base plate portion 11 at the left and right sides of the central horizontally rising plate portion 14. In addition, an upper-board engagement portion 121 bending upwardly and a lower-board engagement portion 122 bending downwardly are provided from the front end of the supporting portion 12. From a tip end of the upper-board engagement portion 121 to a tip end of the lower-board engagement portion 122, a connecting portion 123 is provided in the vertical direction.

An upper end of the connecting portion 123, as shown in FIG. 2A, is formed upwardly than an upper end of the central front plate portion 141.

As shown in FIG. 1, FIG. 3A and FIG. 3B, the central front plate portion 141 is disposed more backward than the connecting portion 123.

As shown in FIG. 1, FIG. 3A, and FIG. 4A, on the top face of the left and right end portions of the central horizontally rising plate portion 14, there are arranged elastic materials 15 extending to an upper end of the central front plate portion 141, and further, extending to the lower end on the front face of the central front plate portion 141. Namely, the elastic material 15 is arranged from a root portion of the central horizontally rising plate portion 14 on the base plate portion 11 to the lower end of the front face of the central front plate portion 141 through the upper end of the central front plate portion 141.

The elastic material 15 is a foam body with closed cells made of EPDM or the like.

The fastening sealing member 1 is integrally formed by bending a stainless steel plate. The supporting portion 12 and central horizontally rising plate portion 14 are structured so that two stainless steel plates are superimposed on each other, and are reinforced by being partially spot-welded.

As shown in FIG. 2A, FIG. 3B, FIG. 4A and FIG. 4B, a vertically rising plate portion 16 projecting forwardly in the vertical direction is provided at a lower portion of the base plate portion 11. The vertically rising plate portion 16 has a reinforcement recess portion 161 between the plate portion and the base plate portion 11.

The spacing portion 13 is provided to support the rear side surface 26 of the siding board 2 fastened on the front face 131 of the spacing portion 13. The front face 131 of the spacing portion 13 is formed at a position that is more forward than the rear side surface 111 of the base plate portion 11 by about 15 mm so that a ventilation space with a sufficient thickness is formed. The front face 131 of the spacing portion 13 is positioned more backwardly than the central front plate portion 141 by a predetermined distance according to the thickness of the siding board 2 to be fastened.

As shown in FIG. 4B, between the supporting portion 12 and a lower portion of the base plate portion 11, which is downward from the supporting portion 12, a lower reinforcement portion 124 for reinforcing the supporting portion 12 from the lower position is formed as an inclined face by bending the base plate portion 11. In addition, between the supporting portion 12 and a upper portion of the base plate portion 11, which is upward from the supporting portion 12, an upper reinforcement portion 125 for reinforcing the supporting portion 12 from the upper position is formed as an inclined face by bending the base plate portion 11.

As shown in FIG. 1, FIG. 2A, FIG. 2B, and FIG. 10, the base plate portion 11 has three screw holes 112 through which screws 4 are inserted for fixing the fastening sealing member to the framework 3, and a sloped portion 113 protruding forwardly and downwardly from the base plate portion 11 is formed in a position downward of the screw hole 112.

In addition, an extension of the sloped portion 113 positioned under the left and right screw holes 112 of the three screw holes 112 is formed as the upper reinforcement portion 125 (refer to FIG. 4B). In addition, as shown in FIG. 4A, part of the rear side surface 111 further bent backwardly is formed from the front end of the sloped portion 113 positioned under the central screw hole 112. This part is bent forwardly horizontally at a position of the central rising plate portion 14 so as to be superimposed on the central rising plate portion 14 (refer to FIG. 8).

By providing the sloped portion 113, as shown in FIG. 12A and FIG. 12B, when the screw 4 inserted through the screw hole 112 is screwed into the framework, the head portion 41 of the screw 4 engages with the sloped portion 113. The head portion 41 of this screw 4 is thrust against the framework 3 (in the direction indicated by arrow D), whereby a force for thrusting the fastening sealing member 1 downwardly (in the direction indicated by arrow E) works at the same time. In this manner, a high fastening force is obtained.

In addition, as shown in FIG. 1, FIG. 2A, FIG. 4A and FIG. 4B, at the base plate portion 11, a reinforcement ribs 114 protruding forwardly by about 1 mm is formed in the transverse direction. In addition, as shown in FIG. 2A, cutouts 115 for bending are formed at both ends of the base end portion of the supporting portion 12 in the base plate portion 11.

Now, a siding boards attachment structure 5 using the fastening sealing member 1 according to the present embodiment will be described with reference to FIG. 5 to FIG. 11.

In the siding boards attachment structure 5, as shown in FIG. 5 and FIG. 6, the fastening sealing member 1 is disposed at the upper, lower, left, and right joint portion at which four siding boards 2 are abutted to each other, and the siding boards 2 are fastened to the building framework 3.

As shown in FIG. 7, the siding boards 2 are siding boards of four-side shiplap structure, each of which has an upper underlying tongue portion 210 provided at the upper end portion 21, a lower overlying tongue portion 220 provided at the lower end potion 22, and lateral underlying tongue portion 23 and lateral overlying tongue portion 24 provided at the left and right sides. As shown in FIG. 5, FIG. 6, FIG. 8, and FIG. 9, siding boards attachment structure 5 is constructed so that the lower overlying tongue portion 220 of the siding board 2 on the upper side is attached to be superimposed on the upper underlying tongue portion 210 of the siding board 2 on the lower side and the lateral overlying tongue portion 24 of the siding board 2 on the right side is attached to be superimposed on the lateral underlying tongue portion 23 of the siding board 2 on the left side.

In the fastening sealing member 1, as shown in FIG. 8 to FIG. 10, the base plate portion 11 abuts against the framework 3 and the spacing portion 13 abuts against the rear side surface 26 of the siding board 2, whereby the fastening sealing member 1 is fixed to the framework 3. A waterproof paper 52 is installed on the front face of the framework 3, and the fastening sealing member 1 is fixed to the framework 3 via the waterproof paper 52. Namely, any underlayment such as a furring strip is not used.

As shown in FIG. 5, FIG. 6, and FIG. 9, in the siding board 2 disposed below the fastening sealing member 1, the upper end portion 21 engages with the lower-board engagement portion 122 of the fastening sealing member 1. In addition, in the siding board 2 disposed above the fastening sealing member 1, the lower end portion 22 is placed on the supporting portion 12 of the fastening sealing member 1 and is engaged with the upper-board engagement portion 121.

As shown in FIG. 9, the elastic material 15 of the fastening sealing member 1 comes into close contact with the lower end portion 22 of the upper siding board 2.

On the siding board 2, as shown in FIG. 7, caulking materials 29 are provided at the upper underlying tongue portion 210 and lateral underlying tongue portion 23. From the front of the caulking material 29, as shown in FIG. 5 and FIG. 6, the lower overlying tongue portion 220 and lateral overlying tongue portion 24 of another siding board 2 are superimposed on the upper underlying tongue portion 210 and the lateral underlying tongue portion 23 respectively, and the caulking material 29 is pressurized, thereby preventing water penetration from joint gap portions 27 and 270 of each of siding boards 2.

The caulking material 29 may be provided on the rear side surface of the lower overlying tongue portion 22 and the lateral overlying tongue portion 24 of the siding board 2.

As shown in FIG. 5, FIG. 8, and FIG. 9, the lateral end portion of the siding board 2 on the lower side, i.e., the lateral end portion of the lateral underlying tongue portion 23 abuts against the vertically rising plate portion 16 of the fastening sealing member 1.

Now, a method of constructing the siding boards attachment structure 5 will be described mainly with reference to FIG. 13 to FIG. 17. The following description is a description of a process of the attachment in accordance with the method of attaching the siding boards.

Figure 13:
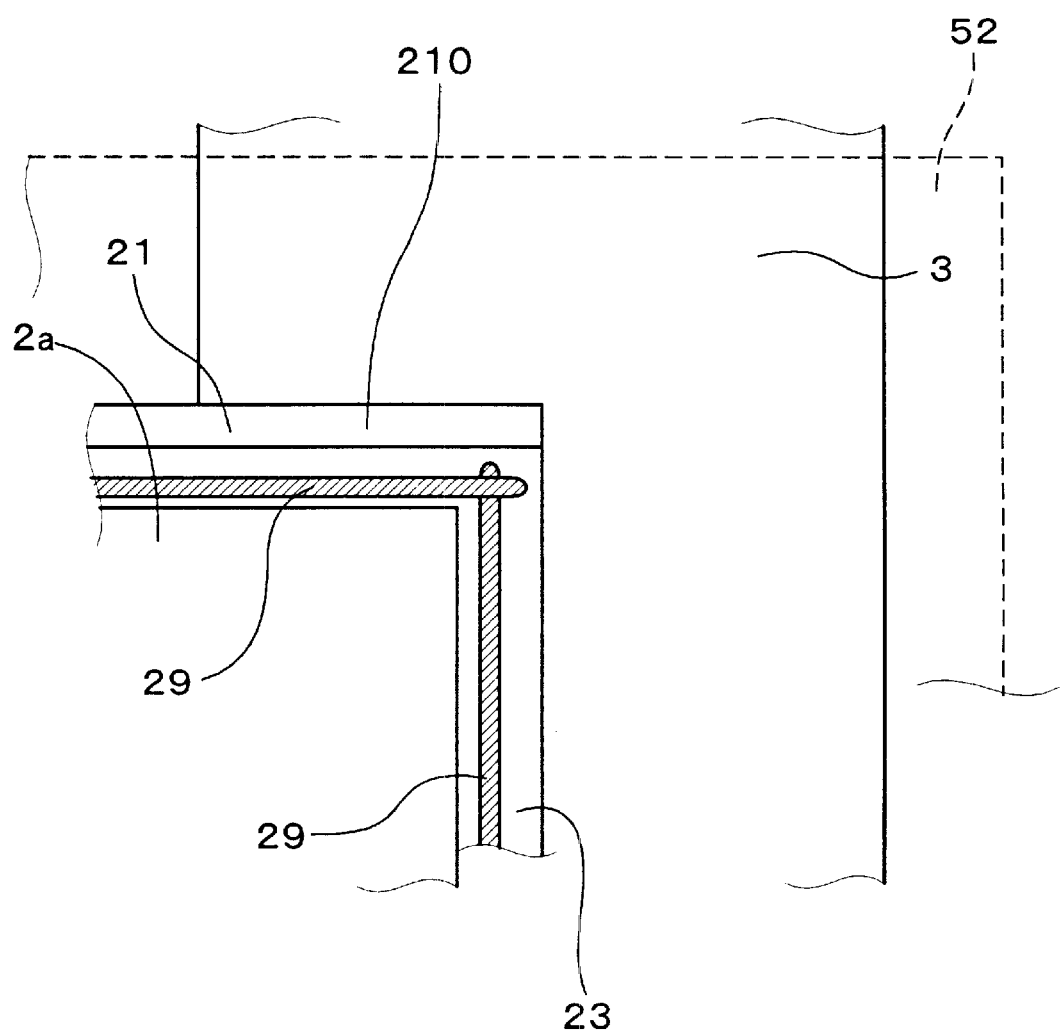
FIG. 13 is an illustrative view illustrating a method of attaching siding boards that represents a state in which a first siding board is disposed in the first embodiment.

First, as shown in FIG. 13, a first siding board 2a is disposed at the framework 3 via the waterproof paper 52.

Figure 14:
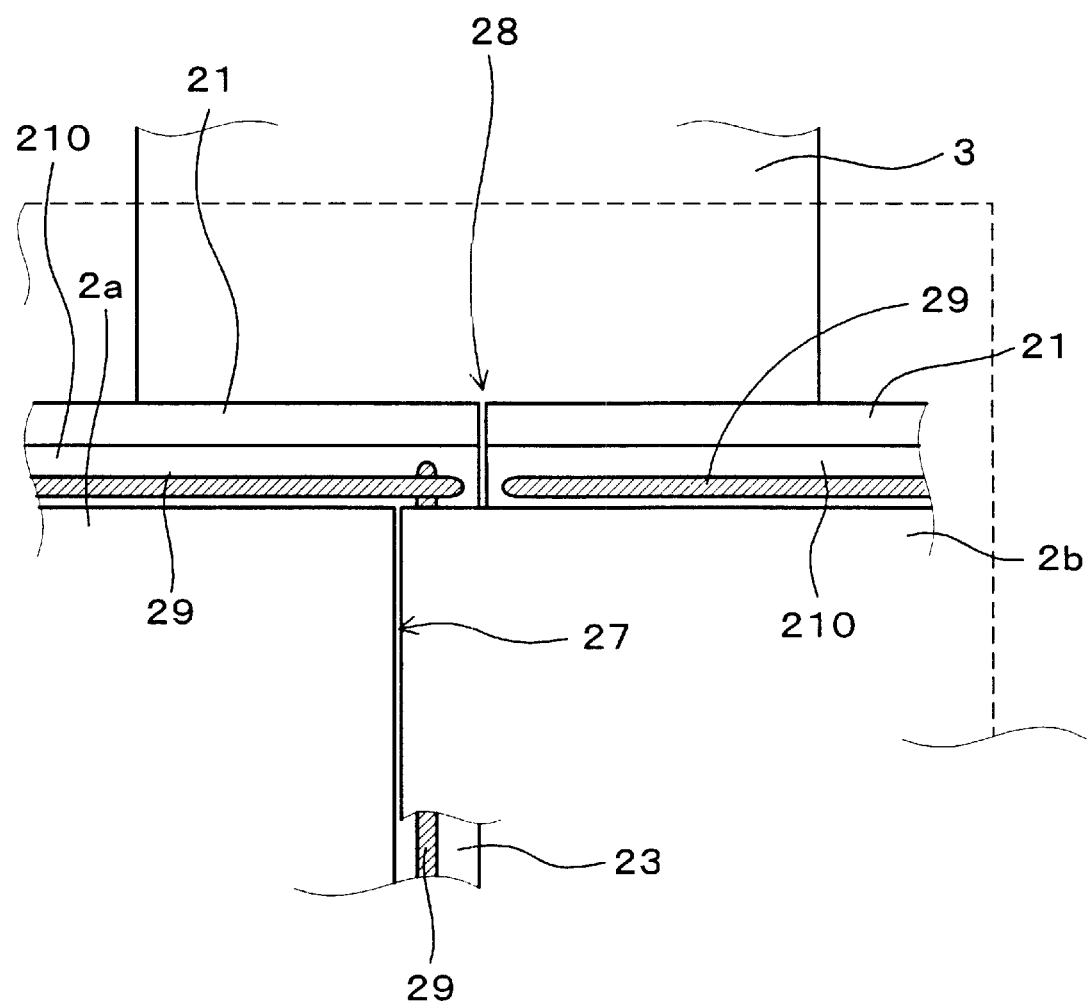
FIG. 14 is an illustrative view illustrating the method of attaching siding boards that represents a state in which a second siding board is disposed in the first embodiment.

Then, as shown in FIG. 14, the second siding board 2b is disposed on the framework 3 by superimposing the lateral overlying tongue portion 24 of the second siding board 2b on the lateral underlying tongue portion 23 of the first siding board 2a so as to obtain left-right side shiplap joint.

Figure 15:
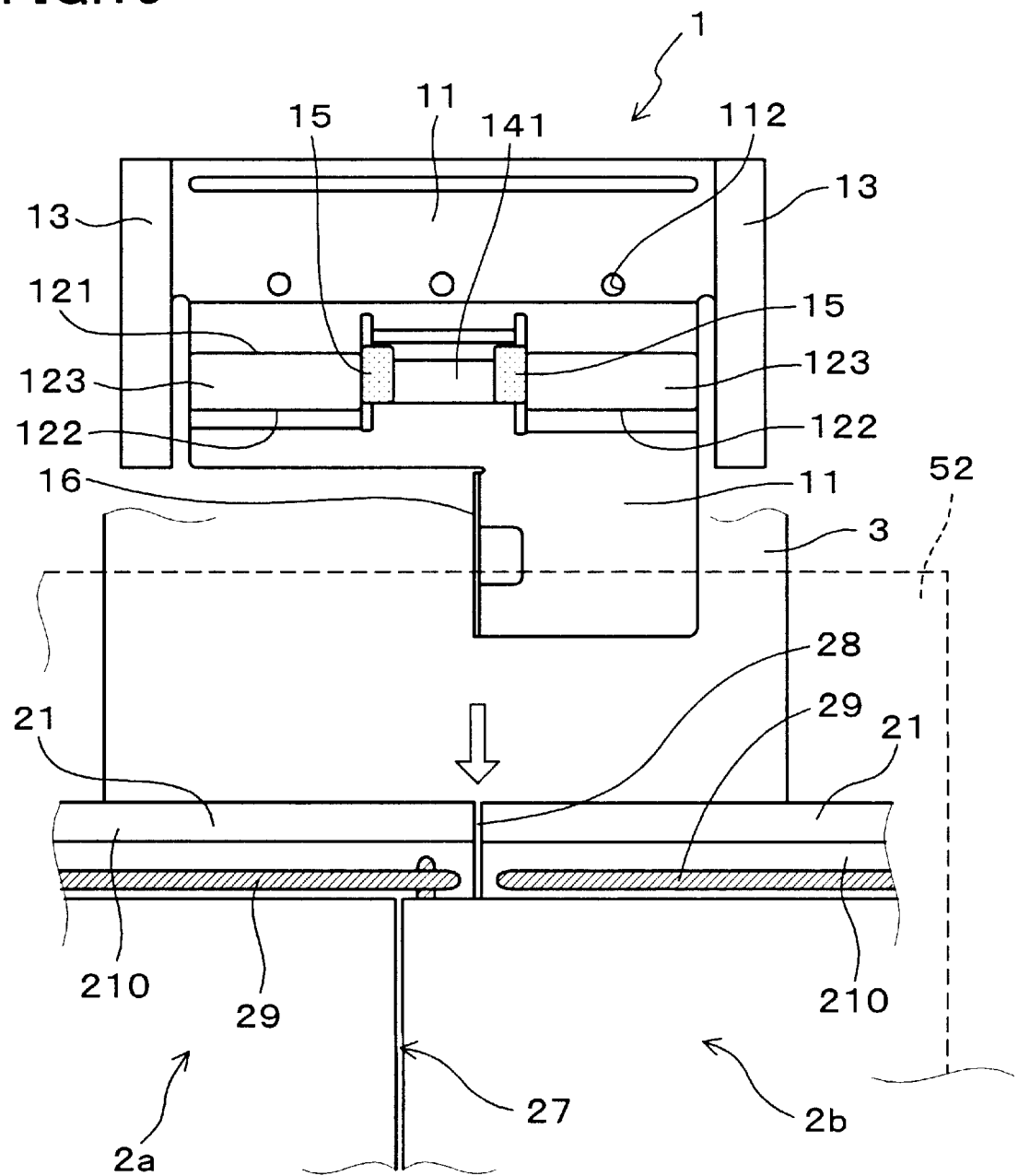
FIG. 15 is an illustrative view illustrating the method of attaching siding boards that represents a method of disposing a fastening sealing member in the first embodiment.

Then, as shown in FIG. 15, the base plate portion 11 of the fastening sealing member 1 is inserted from the upper position between the framework 3 and each of the siding boards 2a and 2b. At this time, the vertically rising plate portion 16 of the sealing member 1 is inserted into a back side joint gap 28 of about 1 mm at the rear surface sides of the left and right siding boards 2a and 2b.

Figure 16:
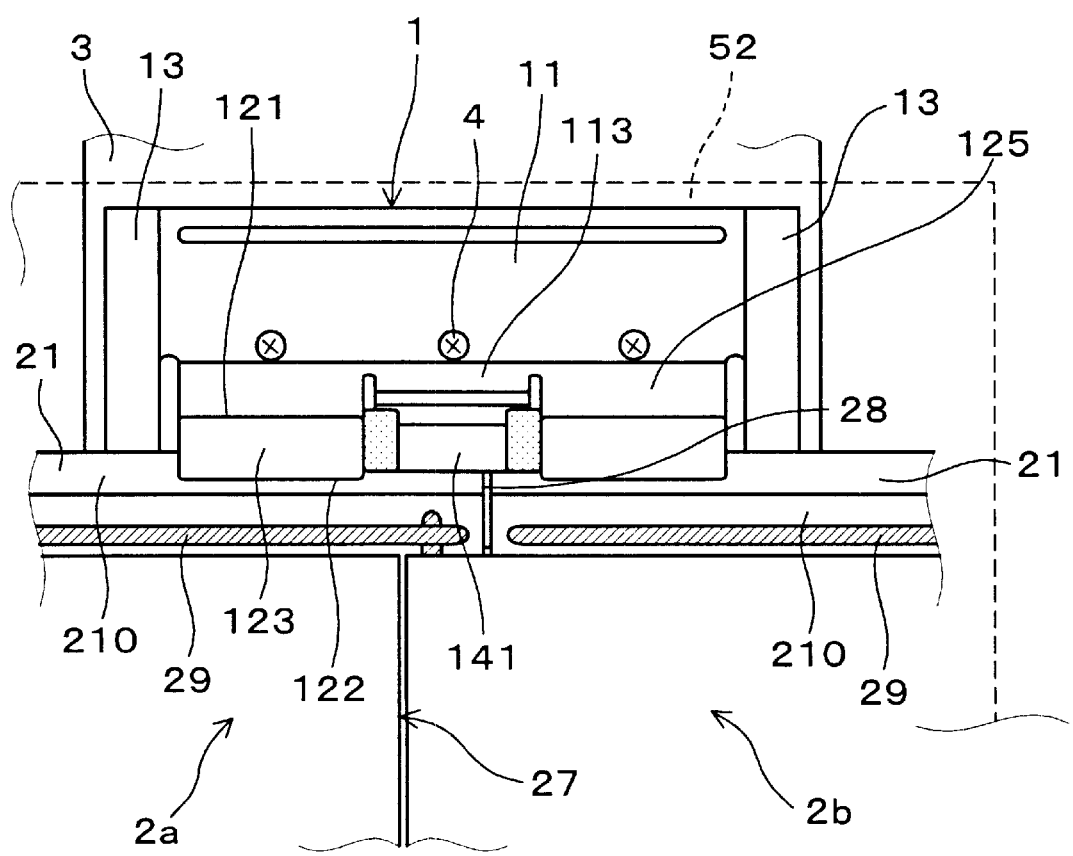
FIG. 16 is an illustrative view illustrating the method of attaching siding boards that represents a state in which the fastening sealing member is fixed to a framework in the first embodiment.

Then, as shown in FIG. 16, the lower-board engagement portion 122 of the fastening sealing member 1 engages with the upper end portion 21 of the siding boards 2a and 2b. At this time, as shown in FIGS. 8 and 10, the base plate portion 11 abuts against the framework 3, and the spacing portion 13 abuts against the rear side surface 26 of the siding boards 2a and 2b. Further, the vertically rising plate portion 16 (refer to FIG. 15) of the fastening sealing member 1 is laterally pressed against the side face of the lateral underlying tongue portion 23 of the first siding board 2a.

Then, as shown in FIG. 12A and FIG. 12B, a screw 4 is inserted through a screw hole 112 of the fastening sealing member 1, and is screwed into the framework 3.

At the final stage of screwing this screw 4, as shown in FIG. 12A, the head portion 41 of the screw 4 abuts against a sloped portion 113 formed at the base plate portion 11 of the fastening sealing member 1. From this state, the, screw 4 is further screwed in the horizontal direction indicated by the arrow D, whereby a force pushing the fastening sealing member 1 downwardly (in the direction indicated by arrow E) works. In this manner, as shown in FIG. 12B, the lower-board engagement portion 122 of the fastening sealing member 1 pressurizes the upper end portion 21 of the siding board 2 on the lower side.

Figure 17:
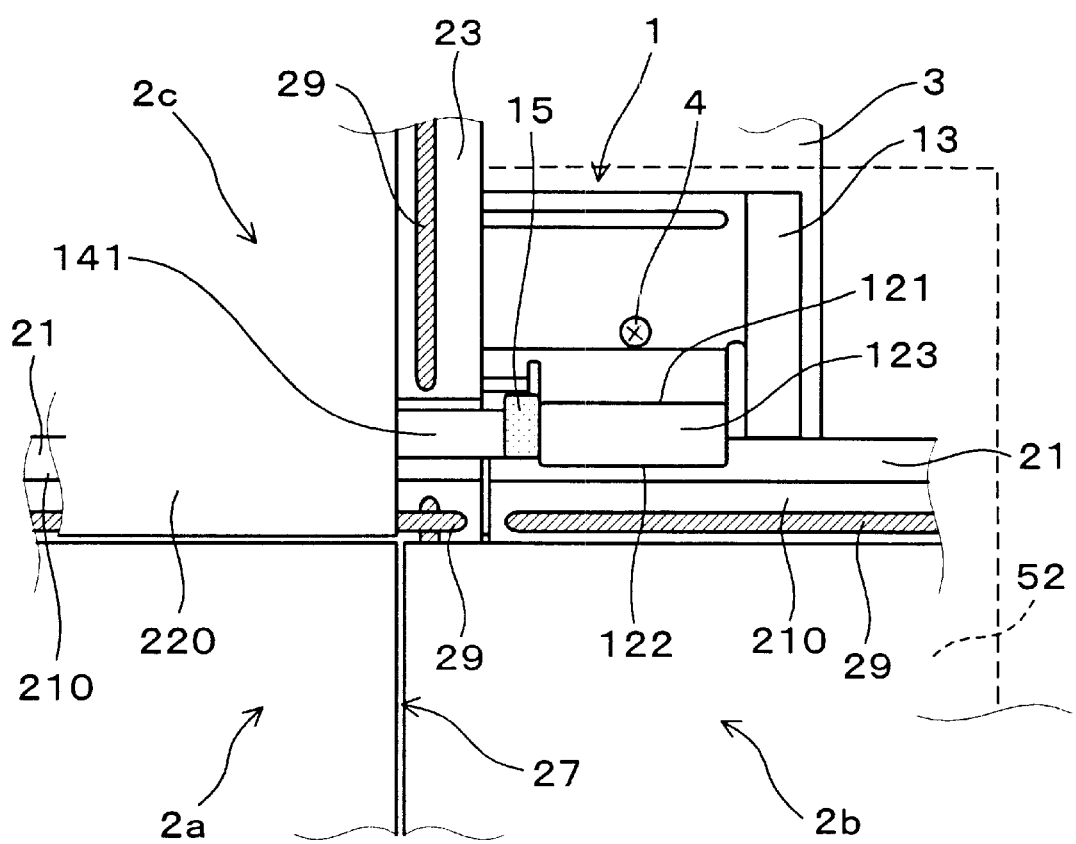
FIG. 17 is an illustrative view illustrating the method of attaching siding boards that represents a state in which a third siding board is disposed in the first embodiment.

Then, as shown in FIG. 17, a third siding board 2c is disposed on the upper left of the above fastening sealing member 1 so that the lower overlying tongue portion 220 is superimposed on the upper underlying tongue portion 210 of the first siding board 2a. At this time, the lower end portion 22 of the siding board 2c is engaged with the upper-board engagement portion 121 of the fastening sealing member 1, and is brought into close contact with the elastic material 15.

Next, a fourth siding board 2d is disposed on the upper right of the above fastening sealing 1 so that the lower overlying tongue portion 220 is superimposed on the upper underlying tongue portion 210 of the second siding board 2b and the lateral overlying tongue portion 24 is superimposed on the lateral underlying tongue portion 23 of the third siding board 2c. At this time, the lower end portion 22 of the siding board 2d is engaged with the upper-board engagement portion 121 of the fastening sealing member 1, and is brought into close contact with the elastic material 15.

By repeating the steps, a siding boards attachment structure 5 in which the siding boards 2 are fastened to the framework 3 by using the fastening sealing member 1 can be provided (FIG. 5).

Now, advantageous effect of the present embodiment will be described here.

The fastening sealing member 1 has the spacing portion 13. Therefore, as described above, the siding boards attachment structure 5 is constructed so that the rear side surface 26 of the siding boards 2 is abutted against the spacing portion 13, whereby a ventilation space 51 with a sufficient thickness can be formed at the back side of the siding boards 2 without using underlayment such as a furring strip (FIG. 6 and FIG. 8 to FIG. 10). Namely, a sufficient gap is provided between each of the siding boards 2 and the framework 3, whereby ventilation properties can be secured.

Therefore, the corrosion or degradation of the siding board 2 or the framework 3 due to an occurrence of condensation can be prevented.

Namely, at the spacing portion 13, the front face 131 is formed at a position that is more forward than the rear side surface 111 of the base plate portion 11 by about 15 mm, and thus, the siding boards 2 can be fastened to be sufficiently spaced from the framework 3. Thus, the ventilation space 51 with a sufficient thickness can be formed at the back side of the siding boards 2.

The fastening seal member 1 has the spacing portions 13 at both of the left and right sides. Thus, as shown in FIG. 10, the siding boards attachment structure 5 is constructed so that the rear side surface 26 of the siding boards 2 is abutted against these spacing portions 13, whereby the siding boards 2 can be stably supported. Therefore, a siding boards attachment structure 5 having excellent wind pressure resistance performance or the like and high fastening strength of the siding boards can be provided.

The fastening sealing member 1 has a base plate portion 11 having a flat rear side surface 111 with a large area. Thus, in the fastening sealing member 1, the rear side surface 111 of the base plate portion 11 can abut against the framework 3 with a large contact area. Thus, the fastening sealing member 1 can be stably fixed to the framework 3, and thus, the siding boards 2 can be stably attached.

Therefore, a siding boards attachment structure 5 with its excellent wind pressure resistance performance and high fastening strength of the siding boards can be constructed.

As shown in FIG. 1, FIG. 3A, FIG. 4A and FIG. 4B, in the fastening sealing member 1, elastic materials 15 are arranged on top faces of the left and right end portions of the central horizontally rising plate portion 14. Therefore, the lower end portion 22 of the siding board 2 disposed upward of the fastening sealing member 1 comes into close contact with the elastic material 15 of the fastening sealing member 1.

In this manner, the rain water 6 that has dropped at the central horizontally rising plate portion 14 of the fastening sealing member 1 and tends to move to the right and left sides, is dammed by the elastic materials 15.

Further, as shown in FIG. 1, FIG. 3A and FIG. 3B, the 20 central front plate portion 141 in the fastening sealing member 1 is disposed more backward than the left and right connecting portions 123. As shown in FIG. 9 and FIG. 10, a rear side face 226 of the lower overlying tongue portion 220 of the siding board 2 on the upper side abuts against the connecting portions 123. Thus, as shown in FIG. 8 and FIG. 10, a forward gap 55 is formed between the back side surface 226 of the lower overlying tongue portion 220 of the siding board 2 and the central front plate portion 141.

In this manner, as shown in FIG. 6, FIG. 8, and FIG. 11, a space formed among the central horizontally rising plate portion 14, elastic materials 15 at the left and right end portions of the central horizontally rising plate portion 14, and the lower end portion 22 of the siding board 2 constitutes a water channel 53 communicating with the forward part of the siding boards attachment structure 5 together with the forward gap 55.

Therefore, as shown in FIG. 11, the rain water 6 that has been dropped at the central horizontally rising plate portion 14 of the fastening sealing member 1 and is dammed by the elastic materials 15, is positively discharged forwardly of the wall face through the water channel 53. Therefore, the rain water 6 does not intrude the inside of the siding boards attachment structure 5.

Namely, as shown in FIG. 11, the rain water 6 intruding the joint gap portion 27 is inhibited from moving in a transverse direction by means of the caulking materials 29, and drops downwardly through the joint gap portion 27. Then, the rain water 6 passes through the front face of the central front plate portion 141 of the fastening sealing member 1, and further, moves to and drops at the joint gap portion 27 placed below.

In addition, the rain water 6 dropping downwardly through the joint gap portion 27 may drop on the top face of the central horizontally rising plate portion 14 of the fastening sealing member 1. Then, this rain water 6 tends to move to the left and right sides on the central horizontally rising plate portion 14.

However, the elastic materials 15 are arranged at the left and right end portions of the central horizontally rising plate portion 14, whereby the rain water 6 is dammed.

Therefore, the rainwater 6 always runs over the central front plate portion 141 through the water channel 53 formed between the heft and right elastic materials 15. In this manner, the rain water 6 is discharged from the joint gap portion 270 of the siding boards 2 on the upper and lower sides forwardly of the wall face.

In this way, by using the fastening sealing member 1, the rain water 6 can be reliably prevented from intruding the inside of the siding boards attachment structure 5, whereby the corrosion or degradation of the siding boards 2 or framework 3 can be reliably prevented.

In addition, the elastic material 15 is made of a rubber foam body with closed cells. Thus, the elastic material 15 itself does not absorb the rain water and can prevent intrusion of the rain water 6 more reliably.

The fastening sealing member 1 has the vertically rising plate portion 16. In construction, the lateral end portion of the siding board 2 disposed at the lower left is abutted against the vertically rising plate portion 16 (FIG. 5). In this manner, the positions of the aligned siding boards 2 in the transverse direction can be precise, and moreover, the displacement of the aligned siding boards 2 in the traverse direction after construction can be prevented.

The lower reinforcement portion 124 and the upper reinforcement portion 125 are formed between the supporting portion 12 and base plate portion 11 (FIG. 4B). In this manner, the strength of the supporting portion 12 is improved, and the siding board 2 with heavy weight can be supported. In the case where the spacing portion 13 is further significantly protruded, the supporting portion 12 must be further extended more forwardly than such protrusion. In this case as well, the supporting portion 12 can bear the load of the siding board 2 sufficiently.

As shown in FIG. 12A and FIG. 12B, at the base plate portion 11, a sloped portion 113 protruded forwardly and downwardly from the base plate portion 11 is provided more downward than the screw hole 112. As described above, when the screw 4 inserted through the screw hole 112 is screwed into the framework 3, the head portion 41 of the screw 4 engages with the sloped portion 113 so that a force of downwardly thrusting the fastening sealing member 1 works.

In this manner, the lower siding board 2 can be fixed more reliably to the framework 3 by means of the fastening sealing member 1.

The sloped portion 113 is integrated with the upper reinforcement portion 125, and thus, an easily manufactured fastening sealing member 1 can be provided. In addition, the fastening sealing member 1 can be integrally formed by bending a metal plate, and thus, an easily-manufactured and inexpensive fastening sealing member 1 can be obtained.

As described above, according to the present embodiment, a fastening sealing member preventing water leakage reliably, ensuring ventilation properties sufficiently and having excellent fastening strength of the siding boards; and a siding boards attachment structure using the same can be provided.

Second Embodiment

Figure 18:
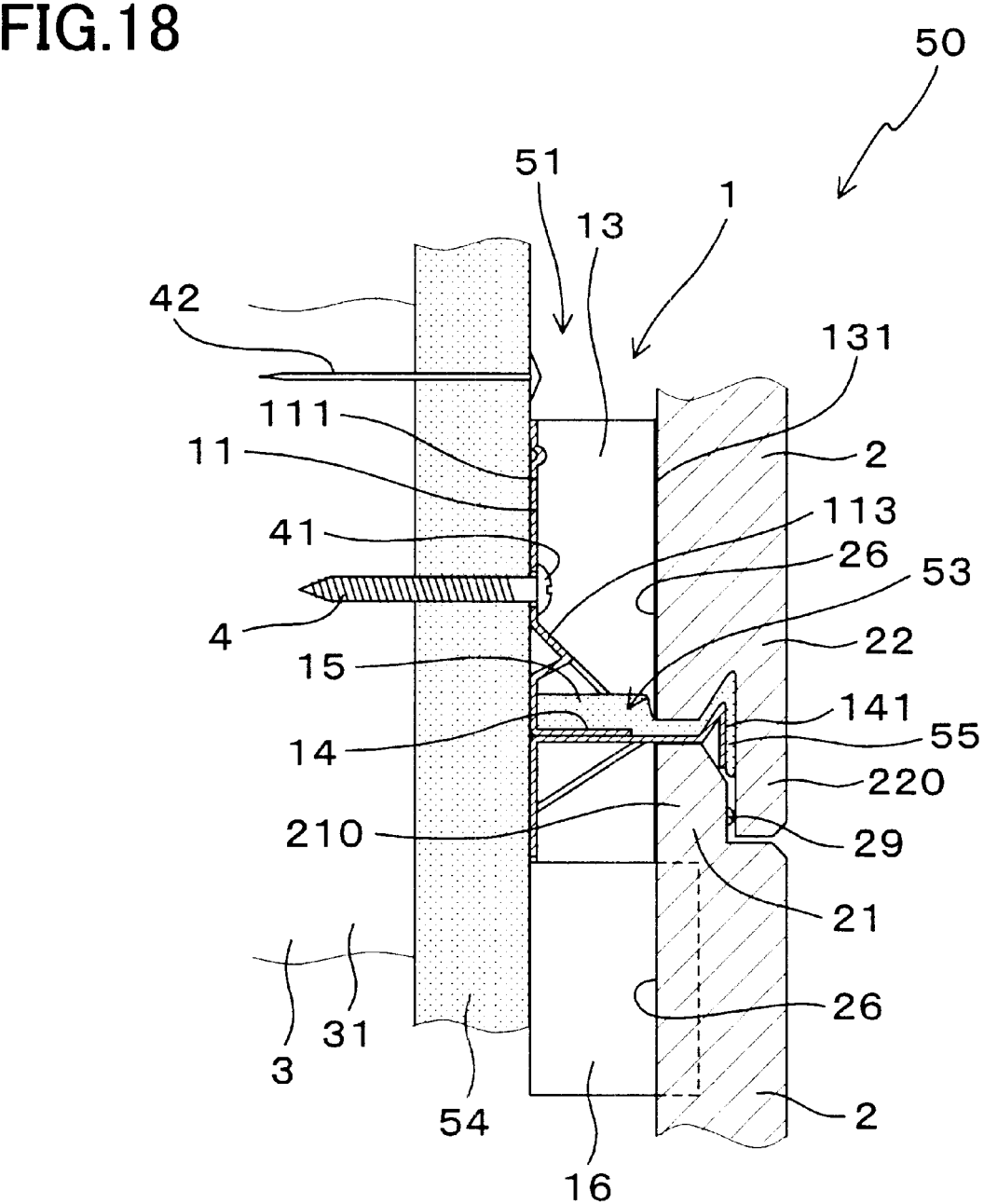
FIG. 18 is a vertical cross section showing a siding boards attachment structure in a second embodiment.
Figure 19:
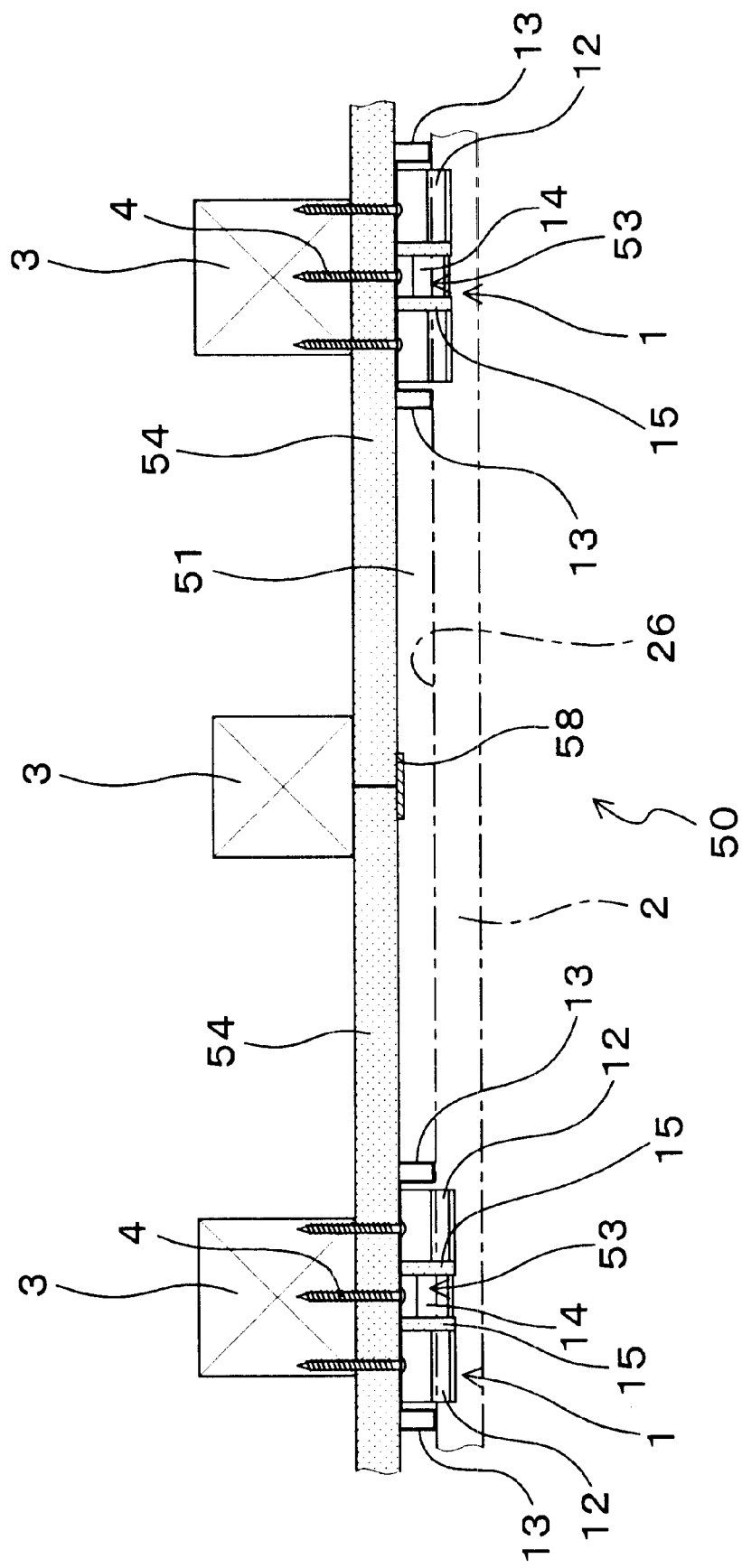
FIG. 19 is a horizontal cross section showing the siding boards attachment structure in the second embodiment.
Figure 20:
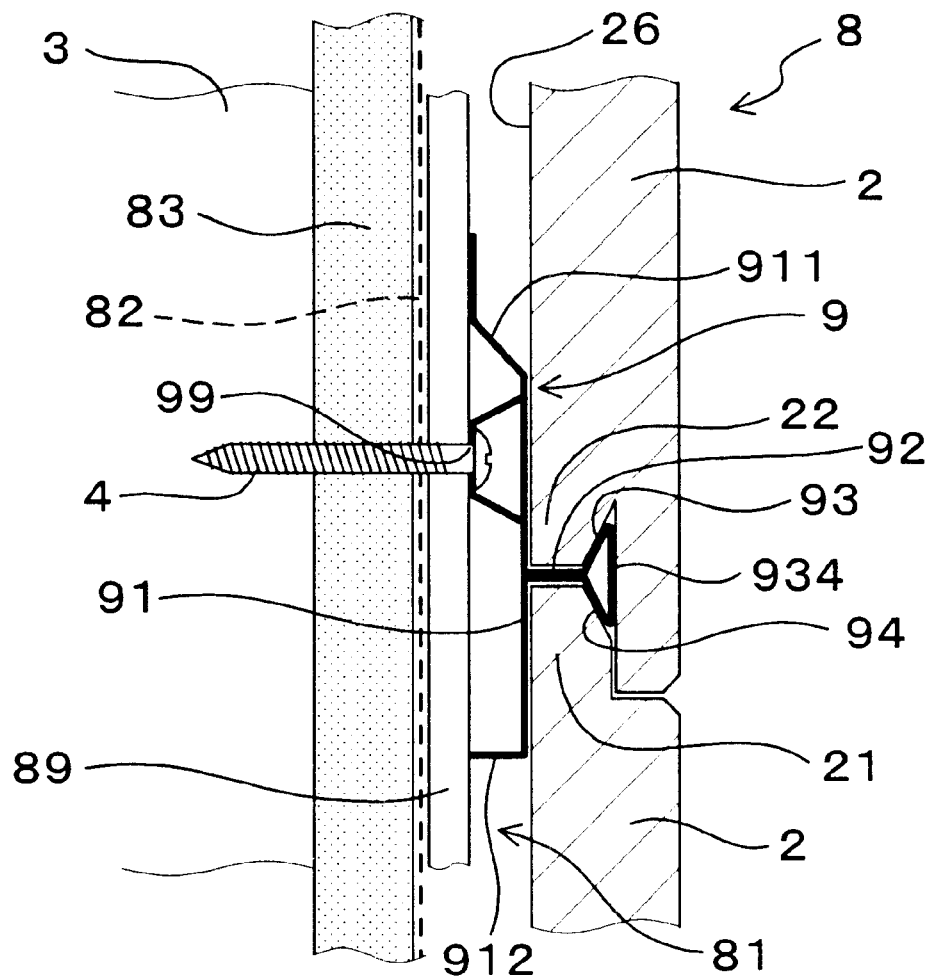
FIG. 20 is a vertical cross section showing a siding boards attachment structure using a furring strip in a conventional example.
Figure 21:
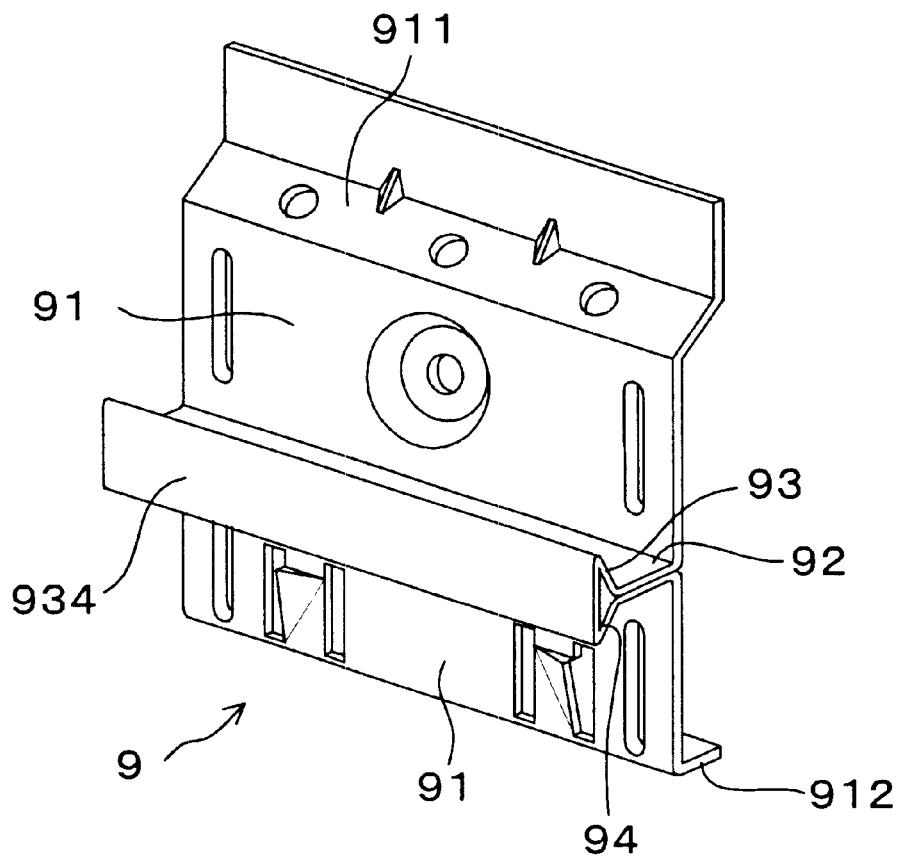
FIG. 21 is a perspective view showing a fastening member in the conventional example.
Figure 24:
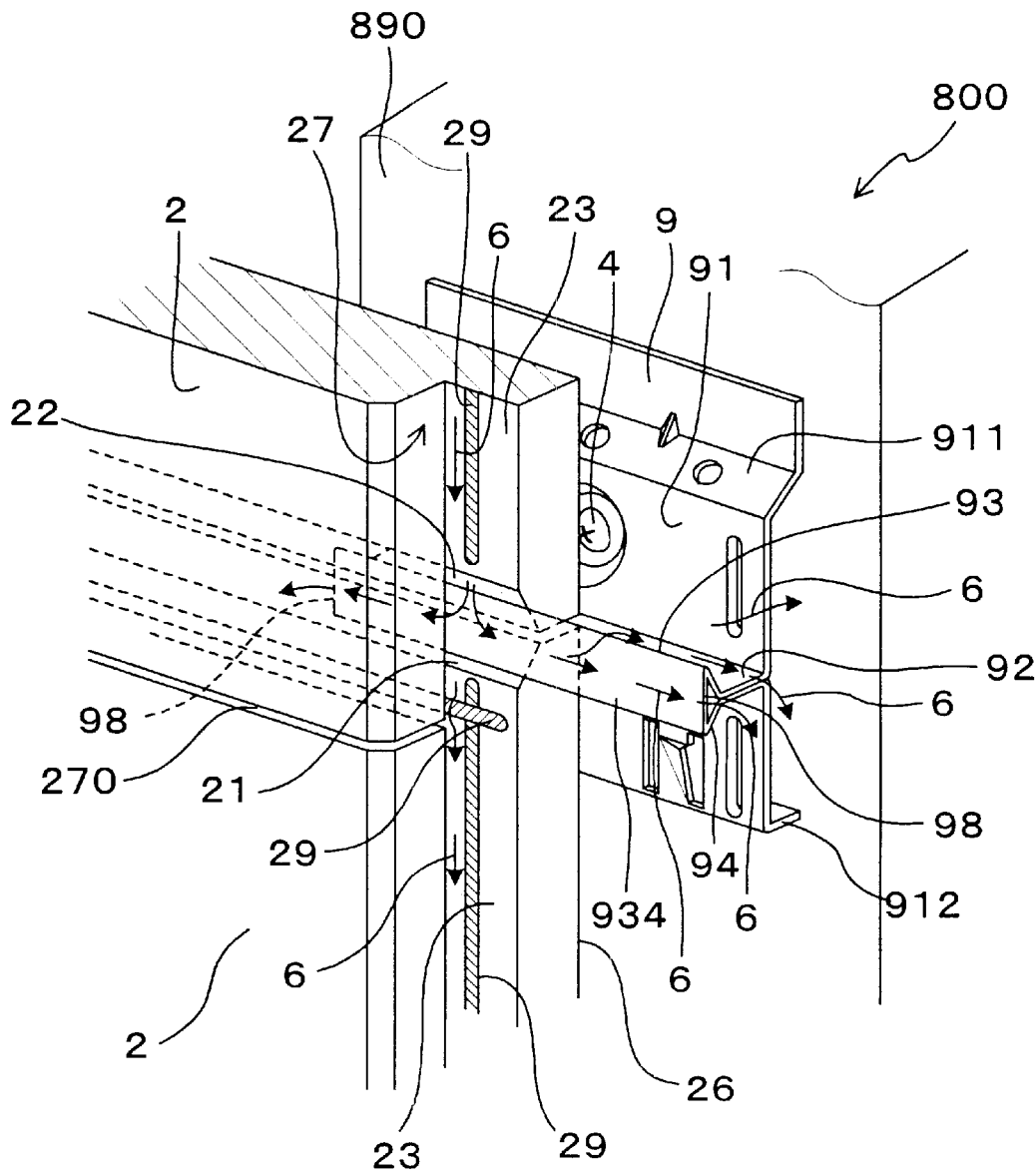
FIG. 24 is an illustrative perspective view illustrating a flow of a rain water at the periphery of a fastening member in a conventional example.

The present embodiment is an example of a siding boards attachment structure 50 in which a heat insulator 54 is fixed to a front face of the framework 3 as shown in FIG. 18 and FIG. 19.

In the siding boards attachment structure 50, as shown in FIG. 18 and FIG. 19, the base plate portion 11 abuts against the heat insulator 54 and the spacing portion 13 abuts against the rear side surface 26 of the siding board 2, whereby the fastening sealing member 1 is fixed to the framework 3.

A ventilation space 51 is formed between the heat insulator 54 and the siding board 2.

As the heat insulator 54, a sheathing board is used. The heat insulator 54 is fixed to the framework 3 by means of an umbrella-shaped nail 42.

In addition, the heat insulator 54 has waterproof properties, and thus, no waterproof paper is arranged. As shown in FIG. 19, the heat insulators 54 are arranged in plurality. At the joint portion of the heat insulators 54, a waterproof tape 58 is attached to ensure waterproof properties.

The other elements are similar to those according to the first embodiment.

In the siding boards attachment structure 50, the heat insulator 54 can be fixed from the front face of the framework 3, and thus, a siding boards attachment structure 50 having a heat insulation effect can be easily constructed.

In addition, in the siding boards attachment structure 50, the rear side surface 111 of the base plate portion 11 is flat, and a contact area with the heat insulator 54 is large. Thus, even if the heat insulator 54 is soft, when the base plate portion 11 of the fastening sealing member 1 is abutted against the surface of the heat insulator 54, the base plate portion 11 is not buried into the heat insulator 54. Therefore, the fastening sealing member 1 can be stably fixed to the framework 3 via the heat insulator 54.

Further, the structure has advantageous effect similar to that according to the first embodiment.

As the heat insulator according to the second embodiment, there can be used styrofoam, OSB (oriented strand board) and the like. In addition, the siding boards attachment structure may be constructed by an external insulation technique. In this case, a styrene board or the like is used as a heat insulator. In these cases as well, advantageous effect similar to that according to the second embodiment can be provided.

Obviously, numerous modifications and variations of the present invention are possible in light of the above teachings. It is therefore to be understood that, within the scope of the appended claims, the invention may be practiced otherwise than as specifically described here.

What is claimed is:

1. A fastening sealing member disposed at upper left, lower left, upper right, and lower right joint portions of four siding boards and configured to fasten the siding boards to a building framework, comprising:

a base plate portion having a flat rear side surface, spacing portions formed at both left and right ends of the base plate portion, each of which has a front face which is forward from the base plate portion, a central horizontally rising plate portion projecting forwardly in the horizontal direction from the base plate portion, a central front plate portion formed in the vertical direction at a front end of the central horizontally rising plate portion, supporting portions projecting forwardly in the horizontal direction from the base plate portion at left and right sides of the central horizontally rising plate portion, an upper-board engagement portion bent upwardly from a front end of the supporting portion, a lower-board engagement portion bent downwardly from the front end of the supporting portion, and a connecting portion provided in the vertical direction between a tip end of the upper-board engagement portion and a tip end of the lower-board engagement portion, wherein the central front plate portion is disposed more backward than the connecting portion, and elastic materials extending to at least an upper end of the central front plate portion are arranged on top faces of the left and right ends of the central horizontally rising plate portion.

2. A fastening sealing member as claimed in claim 1, wherein a vertically rising plate portion risen forwardly in the vertical direction is provided at a lower portion of the base plate portion.

3. A fastening sealing member as claimed in claim 1, wherein the elastic material is a rubber elastic development material or a foam body.

4. A fastening sealing member as claimed in claim 1, wherein the front face of each of the spacing portions is formed at a position that is more forward than a rear side surface of the base plate portion by 15 to 20 mm.

5. A fastening sealing member as claimed in claim 1, wherein a lower reinforcement portion for reinforcing the supporting portion from a lower position is formed between the supporting portion and a lower portion of the base plate portion, which is downward from the supporting portion.

6. A fastening sealing member as claimed in claim 1, wherein an upper reinforcement portion for reinforcing the supporting portion from an upper position is formed between the supporting portion and an upper portion of the base plate portion, which is upward from the supporting portion.

7. A fastening sealing member as claimed in claim 1, wherein the base plate portion comprises screw holes through which a screw for fixing the fastening sealing member to the framework is inserted; a sloped portion protruded forwardly and downwardly from the base plate portion is formed below the screw hole; and when the screw inserted through the screw hole is screwed into the framework, a head portion of the screw abuts against the sloped portion, thereby exerting a force downwardly thrusting the fastening sealing member.

8. A fastening sealing member as claimed in claim 7, wherein the sloped portion is integrated with the upper reinforcement portion.

9. A fastening sealing member as claimed in claim 1, wherein the fastening sealing member is integrally formed by bending a metal plate.

10. A siding boards attachment structure in which a fastening sealing member is disposed at upper left, lower left, upper right, and lower right joint portions of four siding boards, and the siding boards are fastened to a building framework, wherein the fastening sealing member comprises:
a base plate portion having a flat rear side surface,
spacing portions formed at both left and right ends of the base plate portion, each of which has a front face which is forward from the base plate portion,
a central horizontally rising plate portion projecting forwardly in the horizontal direction from the base plate portion,
a central front plate portion formed in the vertical direction at a front end of the central horizontally rising plate portion,
supporting portions projecting forwardly in the horizontal direction from the base plate portion at left and right sides of the central horizontally rising plate portion,
an upper-board engagement portion bent upwardly from a front end of the supporting portion,
a lower-board engagement portion bent downwardly from the front end of the supporting portion, and
a connecting portion provided in the vertical direction between a tip end of the upper-board engagement portion and a tip end of the lower-board engagement portion, wherein the central front plate portion is disposed more backward than the connecting portion, and elastic materials extending to at least an upper end of the central front plate portion are arranged on top faces of left and right ends of the central horizontally rising plate portion; and wherein the fastening sealing member is fixed to the framework, the base plate portion abuts against the framework, the spacing portions abut against the rear side surfaces of the siding boards, an upper end portion of the siding board disposed below the fastening sealing member is engaged with a lower-board engagement portion of the fastening sealing member, a lower end portion of the siding board disposed above the fastening sealing member is placed on the supporting portion of the fastening sealing member and is engaged with the upper-board engagement portion, and the elastic materials of the fastening sealing member come into close contact with a lower end portion of the upper siding board.

11. A siding boards attachment structure as claimed in claim 10, wherein, at the fastening sealing member, a vertically rising plate portion risen forwardly in the vertical direction is provided at a lower portion of the base plate portion of the fastening sealing member, and a lateral end portion of a lower siding board abuts against the vertically rising plate portion.

12. A siding boards attachment structure as claimed in claim 10, wherein, at the fastening sealing member, the front face of each of the spacing portions is formed at a position that is more forward than a rear side surface of the base plate portion by 15 to 20 mm.

13. A siding boards attachment structure in which a fastening sealing member is disposed at upper left, lower left, upper right, and lower right joint portions of four siding boards, the siding boards are fastened to a building framework, and a heat insulator is fixed to a front face of the framework, wherein the fastening sealing member comprises:
a base plate portion having a flat rear side surface,
spacing portions formed at both left and right ends of the base plate portion, each of which has a front face which is forward from the base plate portion,
a central horizontally rising plate portion projecting forwardly in the horizontal direction from the base plate portion,
a central front plate portion formed in the vertical direction at a front end of the central horizontally rising plate portion,
supporting portions projecting forwardly in the horizontal direction from the base plate portion at left and right sides of the central horizontally rising plate portion,
an upper-board engagement portion bent upwardly from a front end of the supporting portion,
a lower-board engagement portion bent downwardly from the front end of the supporting portion, and a connecting portion provided in the vertical direction between a tip end of the upper-board engagement portion and a tip end of the lower-board engagement portion, wherein the central front plate portion is disposed more backward than the connecting portion, and elastic materials extending to at least an upper end of the central front plate portion are arranged on top faces of left and right ends of the central horizontally rising plate portion; and wherein the fastening sealing member is fixed to the framework, the base plate portion abuts against a heat insulator, the spacing portions abut against the rear side surfaces of the siding boards, an upper end portion of the siding board disposed below the fastening sealing member is engaged with a lower-board engagement portion of the fastening sealing member, a lower end portion of the siding board disposed above the fastening sealing member is placed on the supporting portion of the fastening sealing member and is engaged with the upper-board engagement portion, and the elastic materials of the fastening sealing member come into contact with a lower end portion of the upper siding board.

14. A siding boards attachment structure as claimed in claim 13, wherein, at the fastening sealing member, a vertically rising plate portion risen forwardly in the vertical direction is provided at a lower portion of a base plate portion of the fastening sealing member, and a lateral end portion of a lower siding board abuts against the vertically rising plate portion.

15. A siding boards attachment structure as claimed in claim 13, wherein, at the fastening sealing member, the front face of each of the spacing portions is formed at a position that is more forward than a rear side surface of the base plate portion by 15 to 20 mm.

* * * * *